(12) United States Patent
Johnson et al.

(10) Patent No.: US 11,061,881 B2
(45) Date of Patent: Jul. 13, 2021

(54) BOUNDING COST OF FLUSHES IN BUFFER TREES

(71) Applicant: VMware, Inc., Palo Alto, CA (US)

(72) Inventors: Robert T Johnson, Palo Alto, CA (US); Abhishek Gupta, Sunnyvale, CA (US); Jorge Guerra Delgado, Fremont, CA (US); Ittai Abraham, Tel Aviv (IL); Richard P Spillane, Mountain View, CA (US); Srinath Premachandran, Fremont, CA (US); Sandeep Rangaswamy, Mountain View, CA (US); Kapil Chowksey, Cupertino, CA (US)

(73) Assignee: VMWARE, INC., Palo Alto, CA (US)

( * ) Notice: Subject to any disclaimer, the term of this patent is extended or adjusted under 35 U.S.C. 154(b) by 350 days.

(21) Appl. No.: 16/184,861

(22) Filed: Nov. 8, 2018

(65) Prior Publication Data
US 2020/0151268 A1    May 14, 2020

(51) Int. Cl.
*G06F 16/22*    (2019.01)

(52) U.S. Cl.
CPC ...... *G06F 16/2282* (2019.01); *G06F 16/2246* (2019.01)

(58) Field of Classification Search
CPC ................................................. G06F 16/2282
See application file for complete search history.

(56) References Cited

U.S. PATENT DOCUMENTS

| | | | | |
|---|---|---|---|---|
| 6,240,422 | B1* | 5/2001 | Atkins | H04M 15/00 719/315 |
| 7,395,473 | B2* | 7/2008 | Cheng | G01R 31/31703 714/727 |
| 9,311,359 | B2* | 4/2016 | Attaluri | G06F 16/278 |
| 9,317,548 | B2* | 4/2016 | Attaluri | G06F 16/2255 |
| 2008/0275714 | A1* | 11/2008 | Martinez | G06Q 10/06 705/1.1 |
| 2009/0037500 | A1* | 2/2009 | Kirshenbaum | G06F 16/137 |
| 2011/0246503 | A1* | 10/2011 | Bender | G06F 16/258 707/769 |
| 2011/0307750 | A1* | 12/2011 | Narayanan | G01R 31/3177 714/729 |
| 2018/0225321 | A1* | 8/2018 | Boles | G06F 16/9027 |
| 2019/0236156 | A1* | 8/2019 | Fanghaenel | G06F 16/172 |
| 2019/0294710 | A1* | 9/2019 | Gupta | G06F 3/0679 |
| 2020/0012735 | A1* | 1/2020 | Johnson | G06F 16/24552 |

\* cited by examiner

*Primary Examiner* — Eliyah S. Harper

(57) ABSTRACT

A buffer tree structure includes, at each internal node, a buffer having a compacted portion and an uncompacted portion. Insertion of data elements to the buffer tree can occur units called packets. A packet is initially stored in the uncompacted portion of a receiving node's buffer. When a compaction trigger condition exists, packet compaction is performed including a data element compaction operation. A buffer-emptying (flush) operation pushes the compacted packets to children nodes.

15 Claims, 14 Drawing Sheets

BOUNDING COST OF FLUSHES IN BUFFER TREES

CROSS REFERENCE TO RELATED APPLICATIONS

This application is related to the following commonly owned and concurrently filed applications, the content of each of which is incorporated herein by reference in its entirety for all purposes:
- U.S. application Ser. No. 16/029,463, filed Jul. 6, 2018, entitled "Reducing Write Amplification in Buffer Trees"
- U.S. application Ser. No. 16/134,564, filed Sep. 18, 2018, entitled "Balancing Write Amplification and Space Amplification in Buffer Trees"

BACKGROUND

A conventional buffer tree is a search tree in which each node has approximately f children and has an associated buffer that can hold approximately B items. New items are inserted into the root's buffer. Whenever a node's buffer exceeds some limits (e.g., on number of items), some of its items are moved to the buffer of one of its children. Items are typically moved from one node's buffer to another in batches. Items within a buffer are typically maintained in sorted order to facilitate searches.

In conventional processing of a conventional buffer tree, every time items are added to a node's buffer, the new items are sorted with the items already present in the buffer, and the re-sorted buffer is rewritten to disk. As a result, items can be written to disk many times while residing in a node's buffer. This effect is sometimes referred to as "write amplification."

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
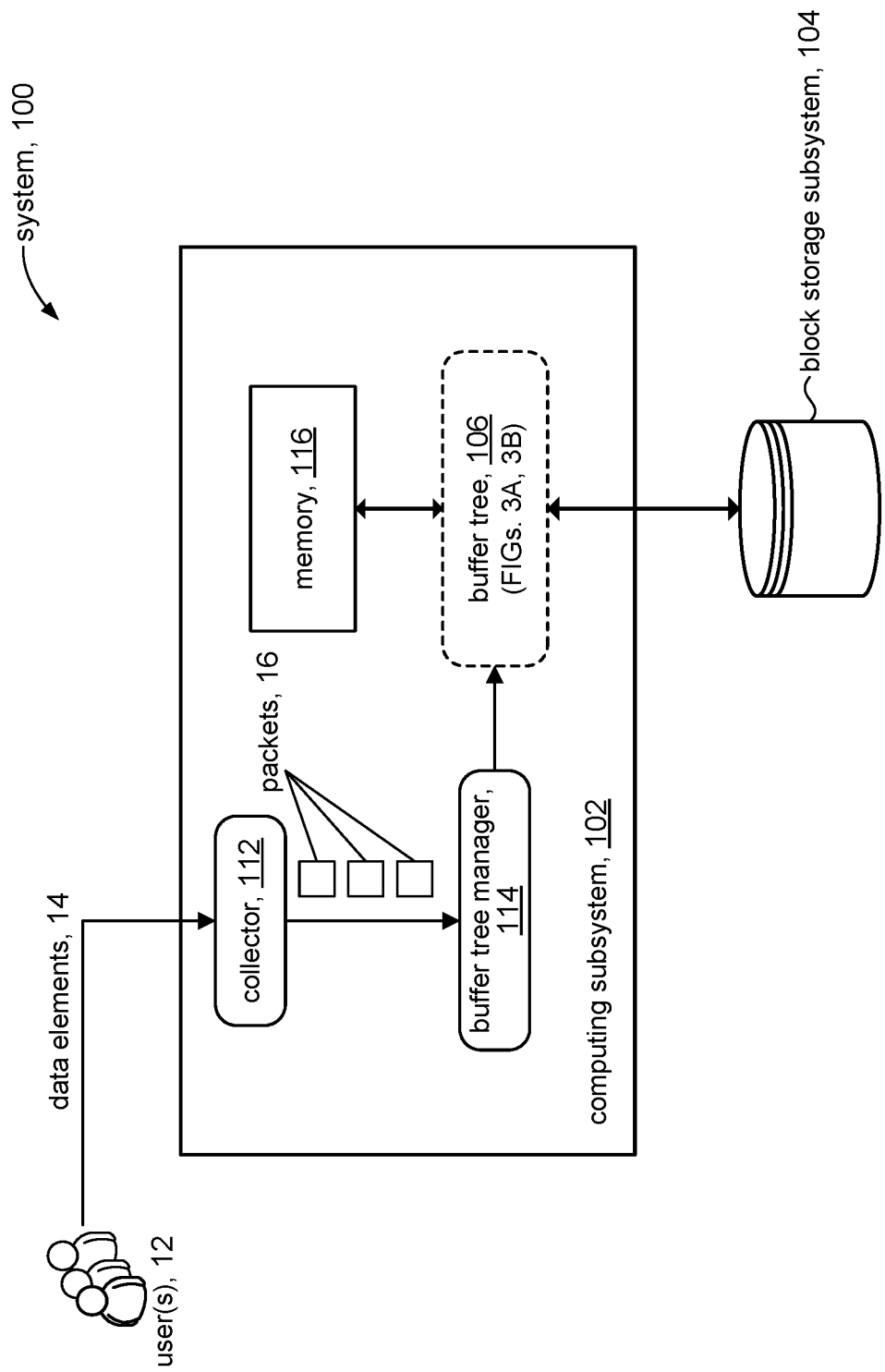
FIG. 1 shows a system level diagram that incorporates a buffer tree in accordance with the present disclosure.

FIG. 1 shows a system 100 in accordance with some embodiments of the present disclosure. In some embodiments, for example, the system 100 can be representative of an information management system such as a database. The system 100 can include a computing subsystem 102 to support data management and data storage in accordance with the present disclosure. The computing subsystem 102 can communicate with a block storage subsystem 104 that can provide mass data storage capability. Data can be stored in a buffer tree 106 that is structured in accordance with the present disclosure.

The computing subsystem 102 can include a collector 112 and a buffer tree manager 114. The collector 112 can receive data elements 14 from users 12 and provide them to the buffer tree manager 114 in the form of packets 16 to be processed and stored (inserted) in the buffer tree 106. The buffer tree manager 114 can provide access to read, write, and otherwise manage the buffer tree 106. Details and processing of a buffer tree 106 in accordance with the present disclosure are discussed below. The computing subsystem 102 can further include an internal memory 116 to support the buffer tree 106 along with the block storage subsystem 104.

Figure 2:
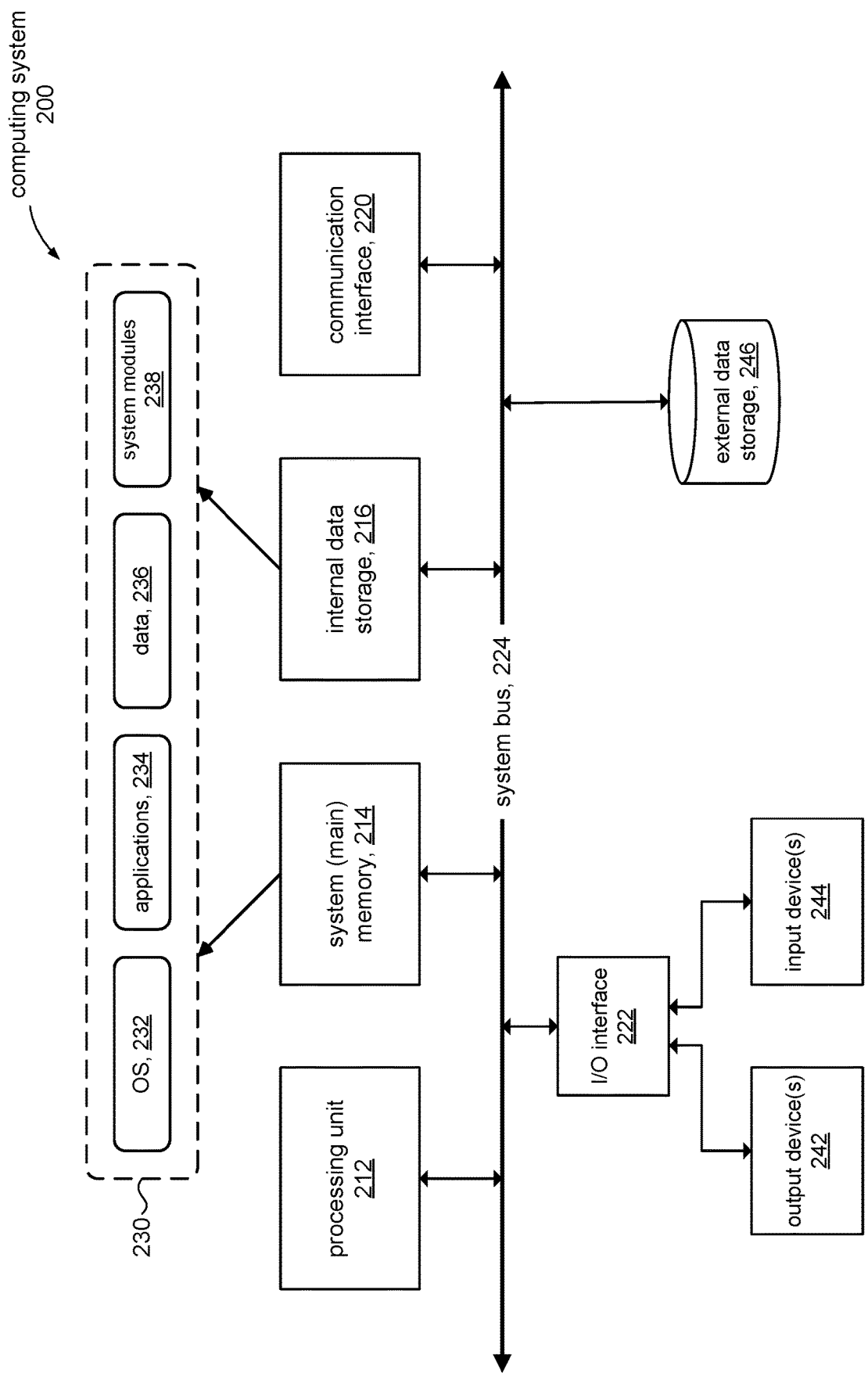
FIG. 2 is a diagram of a computer system in accordance with some embodiments of the present disclosure.

FIG. 2 is a simplified block diagram of an illustrative computing system 200 for implementing one or more of the embodiments described herein (e.g., computing system 102, FIG. 1). The computing system 200 can perform and/or be a means for performing, either alone or in combination with other elements, operations in accordance with the present disclosure. Computing system 200 can also perform and/or be a means for performing any other steps, methods, or processes described herein.

Computing system 200 can include any single- or multi-processor computing device or system capable of executing computer-readable instructions. Examples of computing system 200 include, for example, workstations, laptops, servers, distributed computing systems, and the like. In a basic configuration, computing system 200 can include at least one processing unit 212 and a system (main) memory 214.

Processing unit 212 can comprise any type or form of processing unit capable of processing data or interpreting and executing instructions. The processing unit 212 can be a single processor configuration in some embodiments, and in other embodiments can be a multi-processor architecture comprising one or more computer processors. In some embodiments, processing unit 212 can receive instructions from program and data modules 230. These instructions can cause processing unit 212 to perform operations in accordance with the various disclosed embodiments (e.g., FIG. 11) of the present disclosure.

System memory 214 (sometimes referred to as main memory) can be any type or form of storage device or storage medium capable of storing data and/or other computer-readable instructions, and comprises volatile memory and/or non-volatile memory. Examples of system memory 214 include any suitable byte-addressable memory, for example, random access memory (RAM), read only memory (ROM), flash memory, or any other similar memory architecture. Although not required, in some embodiments computing system 200 can include both a volatile memory unit (e.g., system memory 214) and a non-volatile storage device (e.g., data storage 216, 246).

In some embodiments, computing system 200 can include one or more components or elements in addition to processing unit 212 and system memory 214. For example, as illustrated in FIG. 2, computing system 200 can include internal data storage 216, a communication interface 220, and an I/O interface 222 interconnected via a system bus 224. System bus 224 can include any type or form of infrastructure capable of facilitating communication between one or more components comprising computing system 200. Examples of system bus 224 include, for example, a communication bus (such as an ISA, PCI, PCIe, or similar bus) and a network.

Internal data storage 216 can comprise non-transitory computer-readable storage media to provide nonvolatile storage of data, data structures, computer-executable instructions, and so forth to operate computing system 200 in accordance with the present disclosure. For instance, the internal data storage 216 can store various program and data modules 230, including for example, operating system 232, one or more application programs 234, program data 236, and other program/system modules 238 to implement structures comprising buffer tree 106 and to support and perform various processing and operations disclosed herein.

Communication interface 220 can include any type or form of communication device or adapter capable of facilitating communication between computing system 200 and one or more additional devices. For example, in some embodiments communication interface 220 can facilitate communication between computing system 200 and a private or public network including additional computing systems. Examples of communication interface 220 include, for example, a wired network interface (such as a network interface card), a wireless network interface (such as a wireless network interface card), a modem, and any other suitable interface.

In some embodiments, communication interface 220 can also represent a host adapter configured to facilitate communication between computing system 200 and one or more additional network or storage devices via an external bus or communications channel. Examples of host adapters include, for example, SCSI host adapters, USB host adapters, IEEE 1394 host adapters, SATA and eSATA host adapters, ATA and PATA host adapters, Fibre Channel interface adapters, Ethernet adapters, or the like.

Computing system 200 can also include at least one output device 242 (e.g., a display) coupled to system bus 224 via I/O interface 222, for example, to provide access to an administrator. The output device 242 can include any type or form of device capable of visual and/or audio presentation of information received from I/O interface 222.

Computing system 200 can also include at least one input device 244 coupled to system bus 224 via I/O interface 222, e.g., for administrator access. Input device 244 can include any type or form of input device capable of providing input, either computer or human generated, to computing system 200. Examples of input device 244 include, for example, a keyboard, a pointing device, a speech recognition device, or any other input device.

Computing system 200 can also include external data storage subsystem 246 coupled to system bus 224. In some embodiments, the external data storage 246 can be accessed via communication interface 220. External data storage 246 can be a storage subsystem comprising a storage area network (SAN), network attached storage (NAS), virtual SAN (VSAN), and the like. External data storage 246 can comprise any type or form of block storage device or medium capable of storing data and/or other computer-readable instructions. For example, external data storage 246 can be a magnetic disk drive (e.g., a so-called hard drive), a solid state drive, a floppy disk drive, a magnetic tape drive, an optical disk drive, a flash drive, or the like. In some embodiments, block storage subsystem 104 in FIG. 1 can comprise external data storage subsystem 246.

Figure 3A:
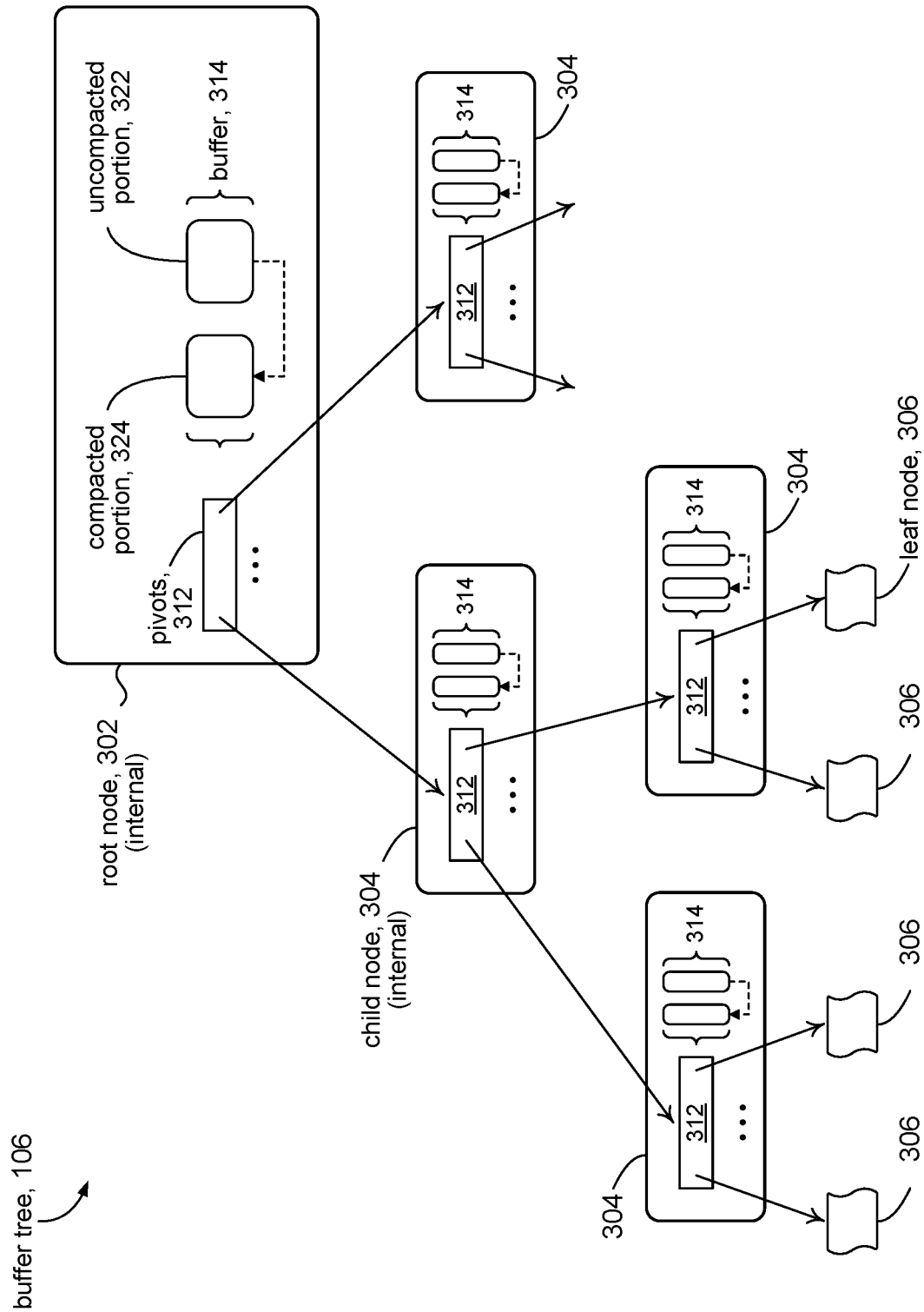
FIG. 3A illustrates some details of a buffer tree of the present disclosure.

FIG. 3A shows some details of buffer tree 106 for storing data elements 14 in accordance with some embodiments of the present disclosure. The buffer tree 106 can include a root node 302 having pivots 312, which point to children nodes 304 of the root node. The root node 302 and children nodes 304 can be referred to as internal nodes. The root node 302 is associated with a corresponding buffer 314 to store data elements 14 received from users 12 of the buffer tree 106. In accordance with the present disclosure, the buffer 314 can comprise an uncompacted portion 322 and a compacted portion 324.

Each child node 304, likewise, includes pivots (pointers) 312 that point to its to children nodes, which can be internal nodes 304 or leaf nodes 306. Each child node 304 is also associated with a corresponding buffer 314 for storing data elements 14. The leaf nodes 306 have no children nodes 304, but rather serve as final destinations in the buffer tree 106 for the data elements 14 as they work they way down from the top of the buffer tree 106, at the root node 302, through the children nodes 304, and to the leaf nodes 306.

Figure 3B:
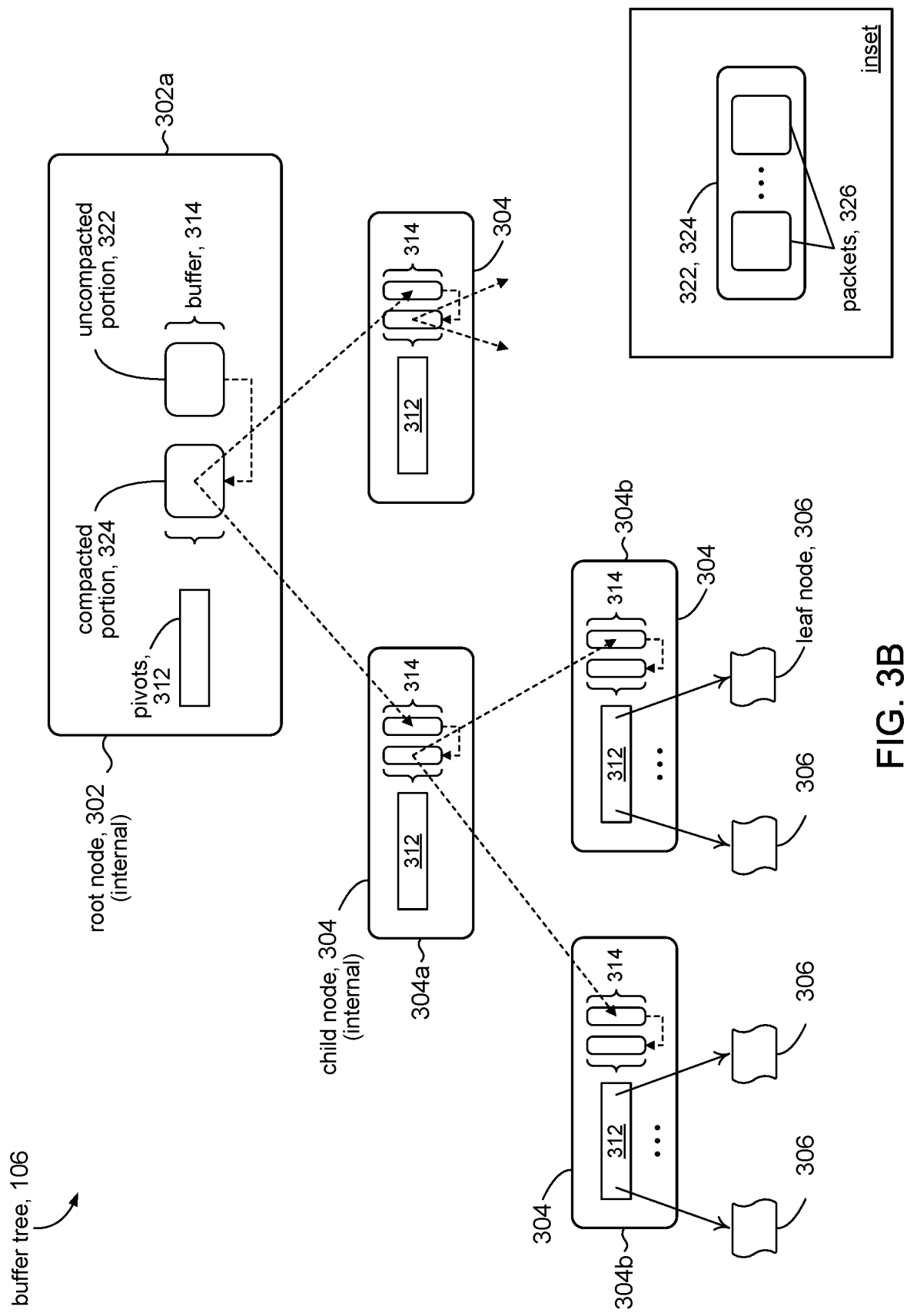
FIG. 3B illustrates data flow in a buffer tree of the present disclosure.

FIG. 3B illustrates some details of data flow in the buffer tree 106 in accordance with the present disclosure, showing the flow of data elements 14 within the buffer 314 of an internal node 302, 304, and between buffers 314 among the internal nodes 302, 304. Some of the arrows between the pivots 312 and the internal nodes 304 illustrated in FIG. 3A are omitted in FIG. 3B to reduce cluttering the figure. With reference to the inset in FIG. 3B, in accordance with some embodiments, the buffer tree 106 can receive and process data elements 14, for insertion into the buffer tree 106, in batches referred to herein as packets 326. As shown in the inset, the uncompacted portion 322 of a buffer 314 can comprise one or more (uncompacted) packets 326 of data elements 14, and likewise the compacted portion 324 of the buffer 314 can comprise one or more (compacted) packets 326 of data elements 14.

Intra-Node Flow.

In accordance with some embodiments, data elements 14 in the buffer 314 of a given internal node (e.g., 302a) can flow between its uncompacted portion 322 and its compacted portion 324. In some embodiments, for example, this intra-node flow of data elements 14 can include storing the data elements 14 contained in one or more packets 326 in the uncompacted portion 322 of the buffer 314 into one or more packets 326 in the compacted portion 324 of the buffer 314 during a process called "data combining," which is discussed in more detail below.

Inter-Node Flow.

In accordance with some embodiments, data elements 14 in the buffer 314 (designated as the "source" buffer) in a given internal node (e.g., 304a) can flow into the buffer(s) 314 (designated as "destination" buffers) in one or more children nodes (e.g., 304b). In some embodiments, for example, this inter-node flow of data elements 14 can include storing one or more packets 326 of data elements 14 contained in the compacted portion 324 of the source buffer 314 into the uncompacted portions 322 of the destination buffers 314.

Figure 4:
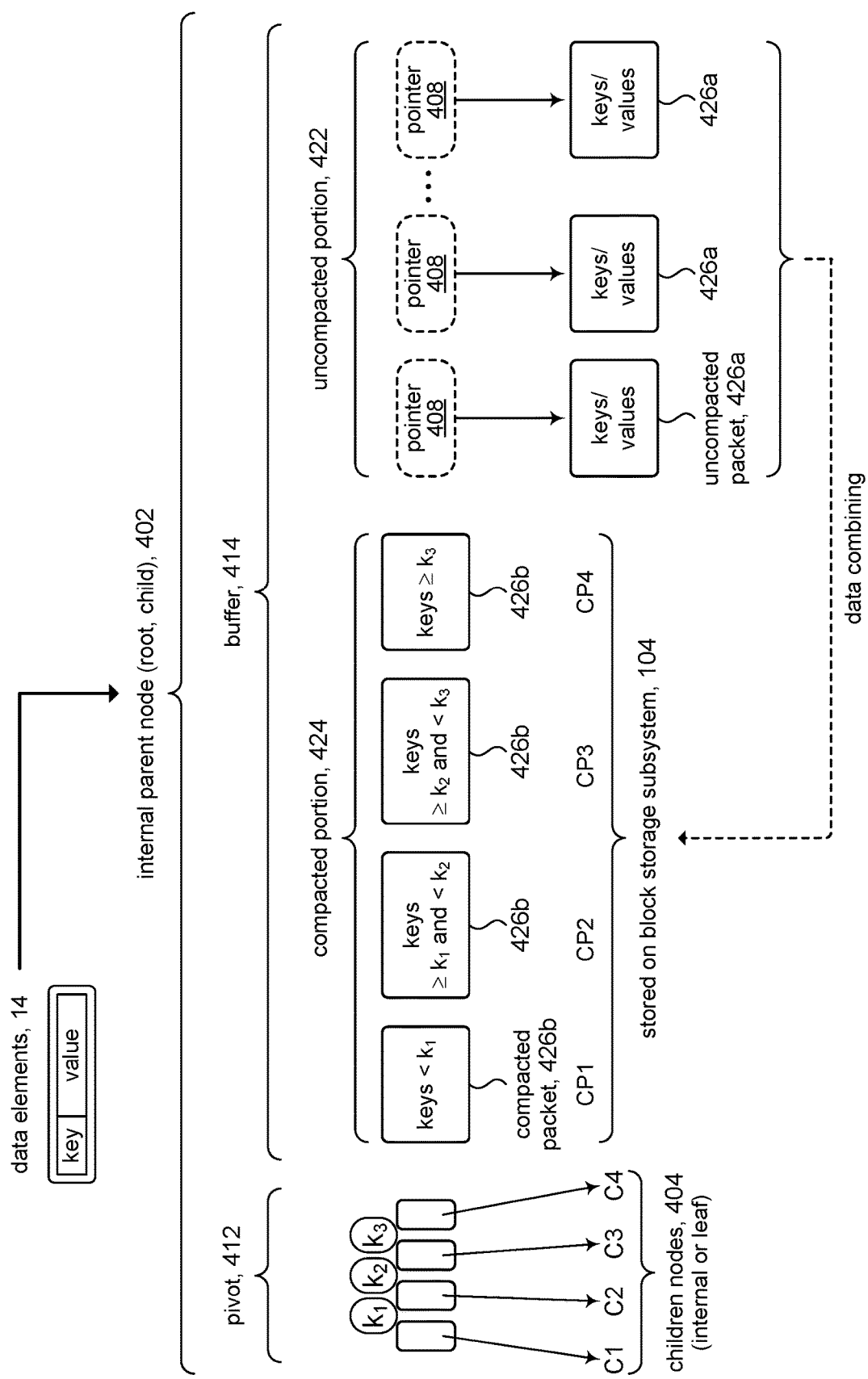
FIG. 4 shows some details of node in a buffer tree of the present disclosure.

FIG. 4 shows additional details of an internal node 402 in accordance with some embodiments of the present disclosure. As noted above, data elements 14 are stored among the nodes of the buffer tree in packets (e.g., 326, FIG. 3B). In some embodiments, a data element 14 can comprise a value and a corresponding key, and can be referred to variously as a data pair, a key-value (k-v) pair, a message, and so on. The 'value' part of the data element 14 represents the information of interest to the user 12 (FIG. 1), which is to be stored in the buffer tree 106. The corresponding 'key' component of the data element 14 can be used as an index into the buffer tree 106 to store the value component and later to access the value component. The data elements 14 can be stored in the buffers of the internal nodes of the buffer tree 106 or in the leaf nodes according to their 'key' components.

The internal node example shown in FIG. 4 is for a buffer tree of degree 4. As such, the pivot 412 of the internal node 402 can comprise one, two, or three pivot keys; the example shows the pivot 412 maxed out at three keys, k1, k2, k3. The pivot 412 includes pointers that point to children nodes 404 according to the pivot keys. The children nodes 404 store the data elements 14 and can be the root nodes of sub-trees of the buffer tree 106, or leaf nodes of the buffer tree 106. For example, the child node C1 can store data elements 14 whose corresponding keys are less than k1. Likewise, child node C2 can store data elements 14 whose keys are ≥k1 and <k2. Child node C3 can store data elements 14 whose keys are ≥k2 and <k3, and child node C4 stores data elements 14 whose keys are ≥k3.

In accordance with the present disclosure, the buffer component 414 of the internal node 402 can comprise an uncompacted portion 422 and a compacted portion 424. The uncompacted portion 422 comprises one or more packets referred to as uncompacted packets 426a. In accordance with the present disclosure, the uncompacted packets 426a are stored in the buffer 414 by storing pointers 408 (represented in the figure by the use of dashed lines) to those uncompacted packets 426a in the uncompacted portion 422 of the buffer 414. The actual location of the data elements 14 comprising the uncompacted packets 426b can be in memory (e.g., main memory 214, FIG. 2) or in data objects on disk (e.g., block storage subsystem 104, FIG. 1). Accordingly, the pointers 408 can be addresses in memory, or addresses or other reference (e.g., file name) to data objects on disk.

The compacted portion 424 of the buffer 414 comprises one or more packets referred to as compacted packets 426b. In accordance with the present disclosure, compacted packets 426b can be created during a process referred to as data combining. During data combining, data elements 14 from one or more uncompacted packets 426a in a given node are written into one or more compacted packets 426b of that node. In accordance with some embodiments, the compacted packets 426b can be written to and stored on disk (e.g., block storage subsystem 104, FIG. 1). Accordingly, when data elements 14 are written to a compacted packet 426b, the write operation involves a disk I/O operation. This data combining process is representative of the intra-node flow of data elements 14 mentioned above in connection with FIG. 3B.

Figure 5:
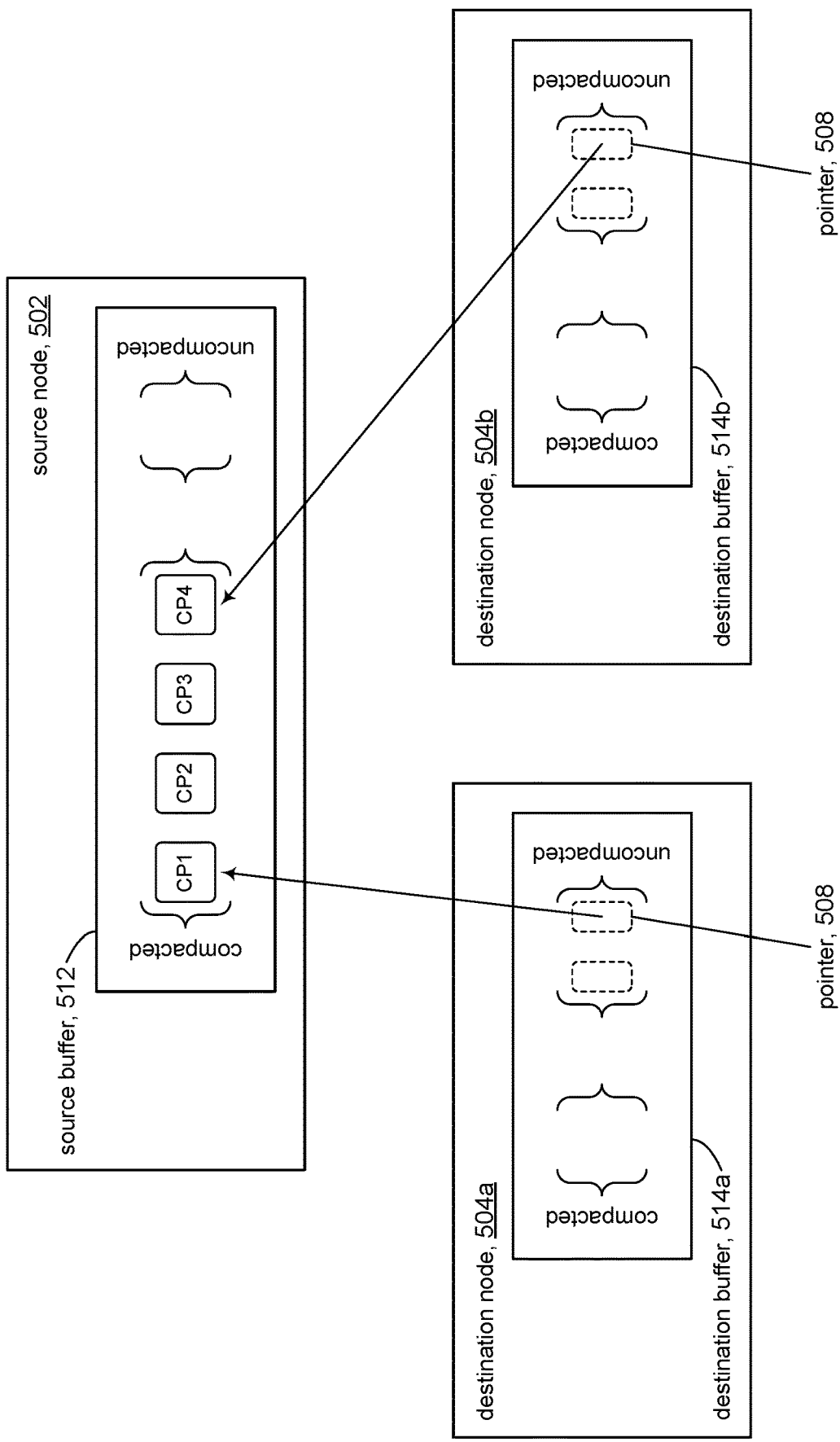
FIG. 5 illustrates the flow of compacted packets in a buffer tree of the present disclosure.

FIG. 5 shows an example to illustrate the inter-node flow of data elements 14 mentioned above in connection with FIG. 3B. The flow of data elements 14 between nodes can include storing one or more of compacted packets CP1, CP2, CP3, CP4 in the compacted portion of a source buffer 512 in a source node 502 into one or more destination nodes 504a, 504b as uncompacted packets. In some embodiments according to the present disclosure, the operation can amount to the storing of pointers 508 (dashed lines) to the compacted packets CP1, CP2, CP3, CP4 in the source buffer 512 into the uncompacted portions of destination buffers (e.g., 514a, 514b) in destination nodes (e.g., 504a, 504b). As explained further below, each compacted packet CP1, CP2, CP3, CP4 can correspond to a child of the source node 502. FIG. 5 shows that CP1 corresponds to child node 504a and CP4 corresponds to child node 504b. In accordance with the present disclosure, a pointer to CP1 can be stored in the uncompacted portion of destination buffer 514a, and likewise CP4 can be stored in the uncompacted portion of destination buffer 514b. Pointers to compacted packets CP2 and CP3 are stored in other children (not shown) of source node 502. Depending on the actual storage locations of the compacted packets (main memory, storage device, etc.), the pointers 508 can be memory locations, storage addresses, etc.

Figure 6:
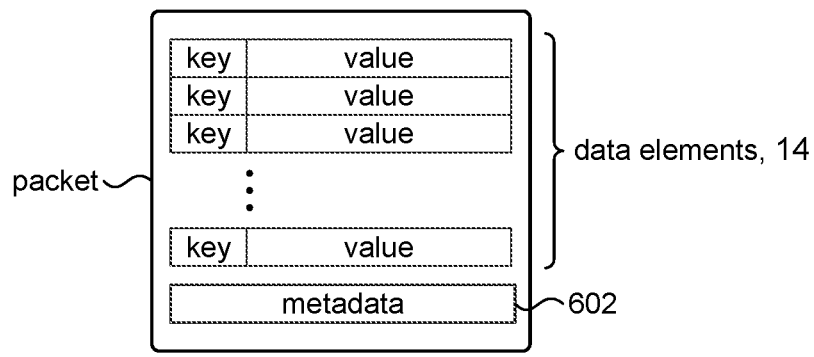
FIG. 6 shows some detail of a packet of data elements.

FIG. 6 illustrates additional details of a packet of data elements 14; e.g., 16, FIG. 1, 326, FIG. 3B. The data elements 14 in a packet can be stored as a list. The list can be in sorted order, in the order that collector 112 (FIG. 1) received the data elements 14, and so on. In some embodiments, a packet can include metadata 602 for tracking and managing its constituent data elements 14.

Figure 7:
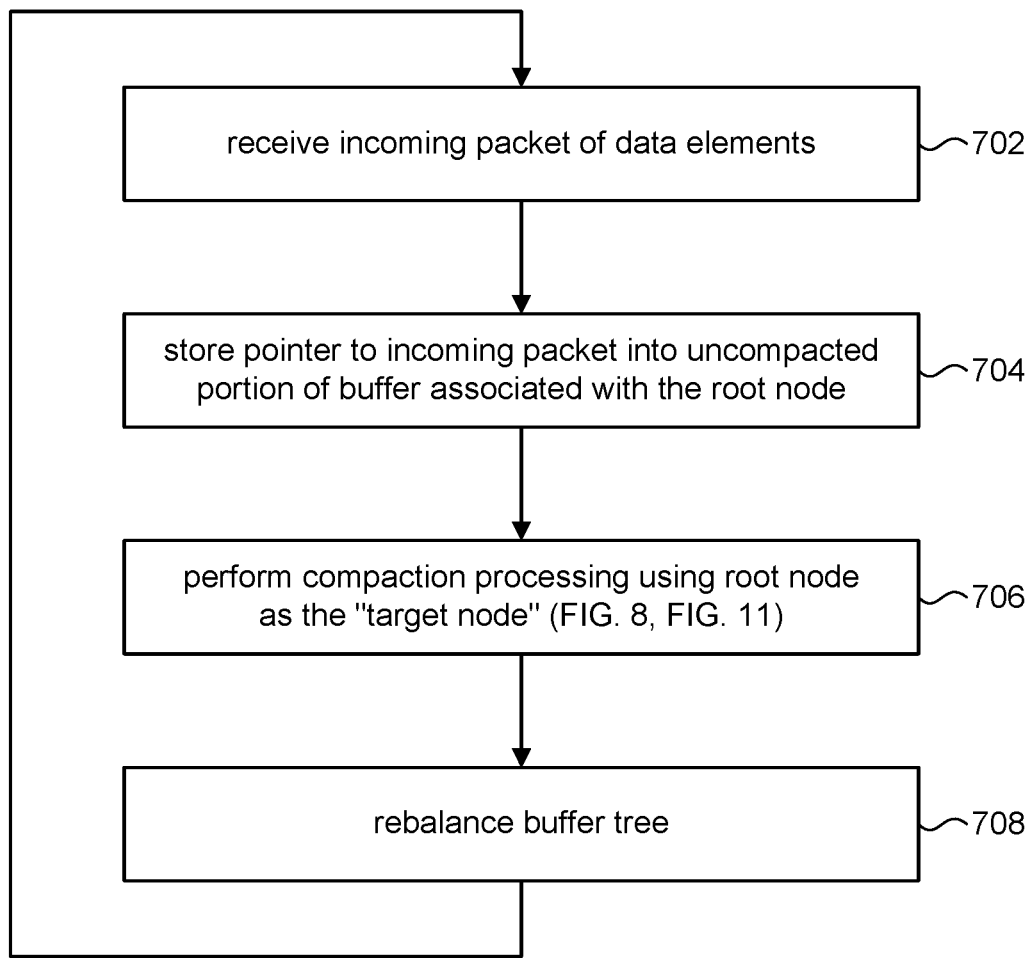
FIG. 7 is a high level flow of a process for insertion of data elements in a buffer tree of the present disclosure.

Referring to FIG. 7, the discussion will now turn to a high level description of processing in the buffer tree manager (e.g., 114, FIG. 1) for storing (inserting) data elements (e.g., 14) in a buffer tree (e.g., 106) in accordance with the present disclosure. In some embodiments, for example, the buffer tree manager can include computer executable program code, which when executed by a computer system (e.g., 200, FIG. 2), can cause the computer system to perform processing in accordance with FIG. 7. The flow of operations performed by the computer system is not necessarily limited to the order of operations shown.

At block 702, the buffer tree manager can receive data elements to be stored in the buffer tree. In some embodiments, the buffer tree manager can receive packets (e.g., 16, FIG. 1) of data elements from a collector (e.g., 112). For example, users can issue write operations to the collector to store data elements (e.g., key-value pairs) to the buffer tree. The collector can gather batches of data elements and send them to the buffer tree manager as packets of data elements. For example, the collector can simply receive some number N of data elements from the users. When N data elements have been collected, the collector can create a packet of received data elements and send it off to the buffer tree manager. In some embodiments, the collector can sort the data elements in the packet before sending it to the buffer tree manager; for example, using the key components of the data elements as the sort key. In other embodiments, the data elements in the packets can remain unsorted, for example, in the order they were received from the users.

At block 704, the buffer tree manager can store a packet received from the collector into the root node of the buffer tree as an uncompacted packet (e.g., 426*a*, FIG. 4). In accordance with the present disclosure, this operation can amount to the buffer tree manager storing a pointer (e.g., 408) to the received packet in the uncompacted portion (e.g., 422) of the buffer in the root node. In some embodiments, for example, the collector can create a packet by allocating memory from main memory and storing data elements into the allocated memory. The pointer that is stored in the uncompacted portion of the buffer can be the address of the beginning of that allocated memory. It is noted that this operation does not involve I/O with a disk (e.g., block storage subsystem 104, FIG. 1), but rather only the manipulation of a pointer; e.g., storing the pointer in the uncompacted portion (e.g., 422) of the buffer in the root node.

At block 706, the buffer tree manager can perform compaction processing on the root node. In accordance with the present disclosure, compaction processing is a process by which data elements propagate down the buffer tree. Details of this operation are discussed in connection with FIG. 8 in accordance with some embodiments, and with FIG. 11 in accordance with other embodiments.

At block 708, the buffer tree manager can rebalance the buffer tree. Embodiments in accordance with the present disclosure can be combined with most techniques for rebalancing in a buffer tree. Although the rebalancing operation is shown as being performed toward the end of processing, it will be appreciated that in other embodiments, the rebalancing operation can be performed at other times during the process. In some embodiments, the processing of FIG. 7 may omit a rebalancing operation. The buffer tree manager can return to block 702 to receive and process the next incoming packet from the collector.

Figure 8:
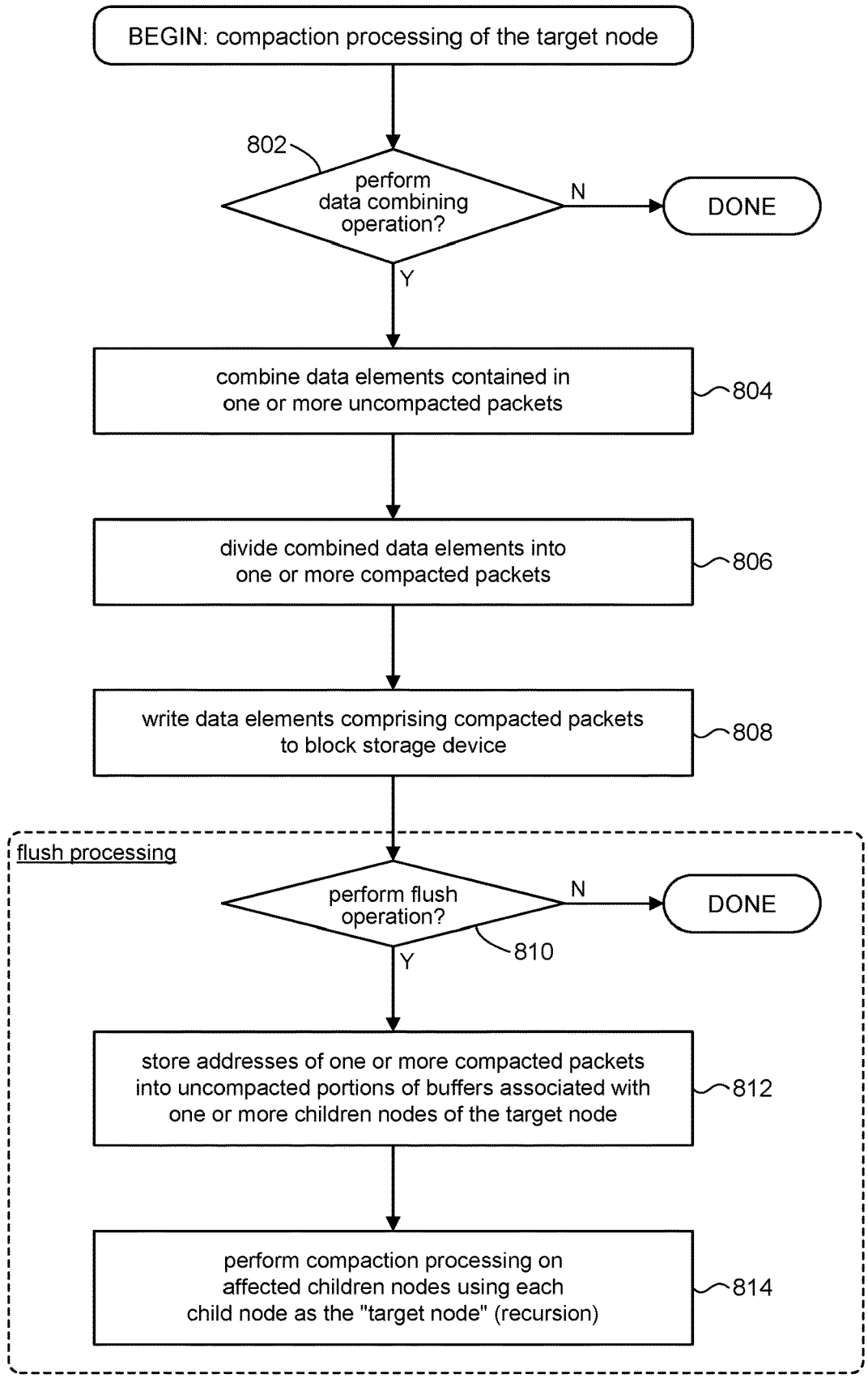
FIG. 8 is a high level flow of a process for processing packets (packet compaction) of data elements in a buffer tree of the present disclosure.

Referring to FIG. 8, the discussion will now turn to a high level description of processing in the buffer tree manager to conduct compaction processing in accordance with the present disclosure. In some embodiments, for example, the buffer tree manager can include computer executable program code, which when executed by a computer system (e.g., 200, FIG. 2), can cause the computer system to perform the processing in accordance with FIG. 8. The flow of operations performed by the computer system is not necessarily limited to the order of operations shown.

Compaction processing is performed on a target node as the "target" of the compaction operation. In block 706 of FIG. 7, for example, compaction processing is invoked using the root node as the target node. The following description of FIG. 8 can therefore be read where the target node is the root node. It is noted, however, that compaction processing can also be invoked using children of the root node as the target nodes. In some embodiments, for example, compaction processing can be recursive in which processing of a target node can result in compaction processing of children of the target node. This, in turn, can invoke compaction processing of children of the children of the target node, and so on. This aspect of the embodiment is discussed below.

At block 802, the buffer tree manager can make a determination whether to perform a data combining (packet compaction) operation, or not, on the target node. As explained above, data combining is a process by which data elements stored in one or more uncompacted packets in the uncompacted portion of the buffer of the target node are stored into one or more compacted packets in the compacted portion of the buffer. In some embodiments, the criterion for whether to perform data combining can be based on the size of the uncompacted portion of the buffer. For example, if the total of the sizes of the uncompacted packets exceeds a predetermined value, B, then data combining can be performed. In some embodiments, for instance, the predetermined value B can be based on a maximum size of the buffer. Although the particular value of B is not relevant to the present disclosure, in some instances the buffer size can be a multiple of the block size of the block storage subsystem 104 (FIG. 1); e.g., block sizes can be 512 bytes, 4 KB, etc. Compaction processing of the target node is not performed (N branch) if the buffer tree manager determines that data combining is not required, and compaction processing on the target node can be deemed complete. Otherwise, compaction processing proceeds, and processing can continue with block 804 (Y branch).

Figure 9:
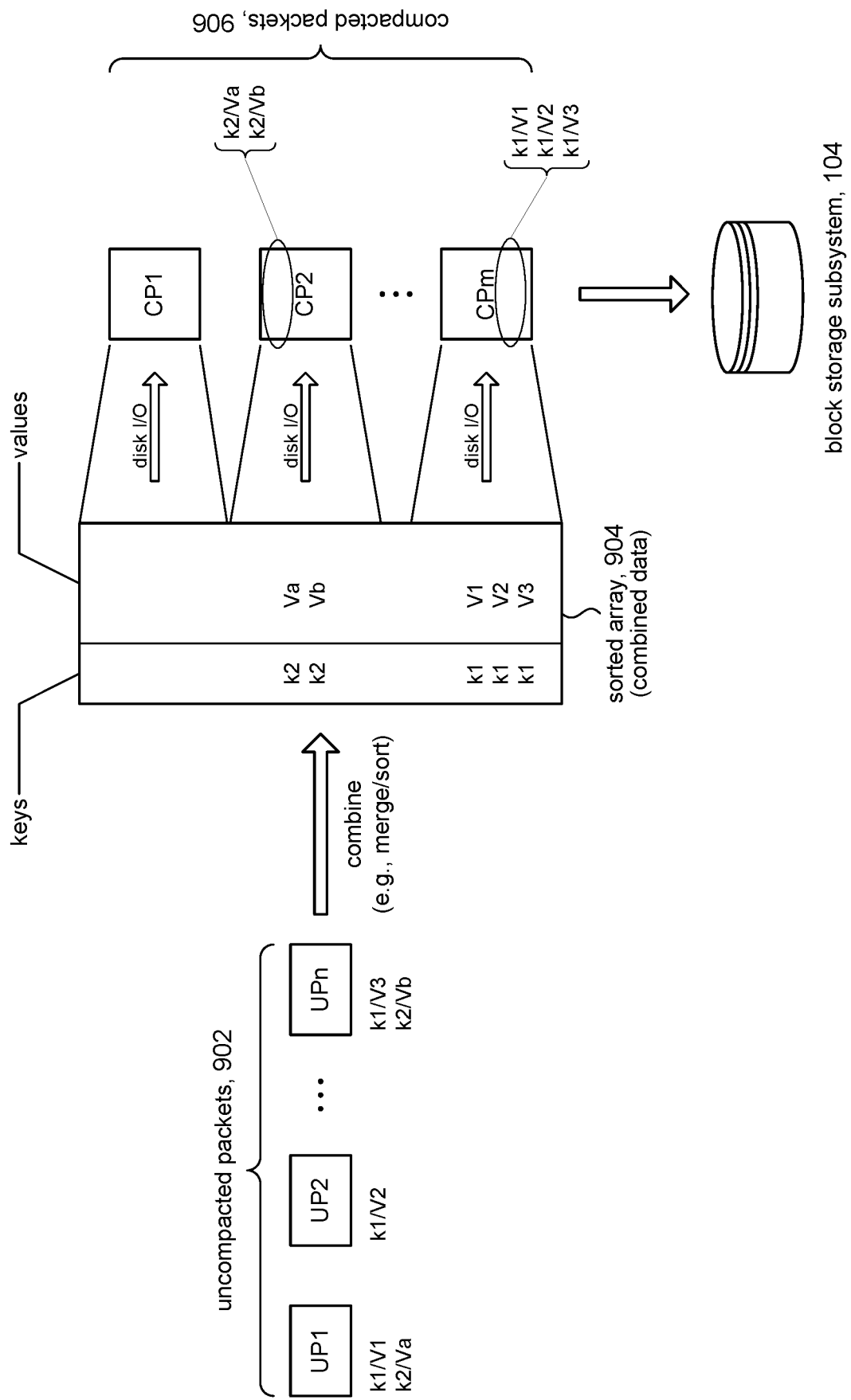
FIG. 9 illustrates some details for combining data elements from uncompacted packets in accordance with the present disclosure.

At block 804, the buffer tree manager can begin the data combining operation by combining the data elements contained in one or more of the uncompacted packets in the uncompacted portion of the buffer of the target node. FIG. 9 illustrates an example of the data combining operation. In some embodiments, the data combining operation can involve all the uncompacted packets 902 in the uncompacted portion of the buffer. In other embodiments, the data combining operation can involve a subset of the uncompacted packets 902. FIG. 9 shows that data elements with the same key can appear in different uncompacted packets 902. For example, a data element with key k1 appears in uncompacted packets UP1, UP2, and UPn, and a data element with key k2 appears in UP1 and UPn.

In some embodiments, each of the uncompacted packets 902 can be stored as a sorted array. Combining the data elements in the uncompacted packets 902 can include a merge/sort operation. A merge/sort operation can merge the data elements from the uncompacted packets 902 into an array 904, sorted according to their corresponding keys. Data elements having the same key will be grouped together in the array 904, and can be sorted according to secondary criteria other than their key. In some embodiments, for example, data elements having the same key can be sorted according to their time of entry in the buffer tree.

Returning to FIG. 8, at block 806, the buffer tree manager can divide the combined data elements, stored in array 904, into one or more compacted packets in the compacted portion of the buffer. In accordance with the present disclosure, the buffer tree manager can define a set of compacted packets according to the current set of keys in the pivot of the target node. For example, each compacted packet can correspond to a child of the target node and in particular to the key range associated with that child. This aspect of the present disclosure is illustrated in the example of FIG. 4. The pivot 412 shows the set of keys: k1, k2, k3. The corresponding children nodes C1, C2, C3, C4 are keyed according to the following key ranges: keys in the range <k1, keys in the range ≥k1 and <k2, keys in the range ≥k2 and <k3, and keys in the range ≥k3. Each compacted packet 426*b* corresponds to a child node (C1, C2, C3, C4) and to a key range (<k1, ≥k1 and <k2, ≥k2 and <k3, and ≥k3). Accordingly, the buffer tree manager can divide the combined data elements among the compacted packets 426*b* according to their corresponding key ranges. Thus, in our example in FIG. 4, the buffer tree manager would store data elements having keys in the range <k1 into compacted packet CP1, data elements having keys in the range ≥k1 and <k2 would be stored in compacted packet CP2, data elements having keys in the range ≥k2 and <k3 would be stored in CP3, and data elements having keys in the range ≥k3 would be stored in CP4.

Turning to FIGS. 8 and 9 and continuing with the discussion of block 806, since the data elements in the compacted packets 906 are sorted according to their keys, data elements that are identified by a given key only appear in, or are unique to, one of the compacted packets 906, unlike in the uncompacted packets 902 where data elements identified by a given key can appear in multiple uncompacted packets 902. FIG. 9 illustrates this example. A data element (k1/V1) appears in uncompacted packet UP1. Another data element (k1/V2) appears in UP2 and another (k1/V3) in UP3. The k1 key indicates they are the same data element, but with different values V1, V2, V3 (e.g., written out at different times and/or by different users). FIG. 9 further shows that the data element k2/Va and k2/Vb appear in uncompacted packets UP1 and UP3, respectively. Accordingly, uncompacted packets 902 can have overlapping key ranges. After the buffer tree manager divides up the combined data elements, however, we see that all the data elements with key k1 have been merged and sorted, and stored in only one compacted packet, namely CPm, and likewise all the data elements with key k2 have been merged and sorted and stored in only one compacted packet, namely CP2; in other words, compacted packets 906 do not have overlapping keys.

Continuing with FIG. 8, at block 808, the buffer tree manager can write the compacted packets to a suitable block storage device. This action incurs a write (I/O) operation to the block storage device. The data combining operation, invoked from block 802, can be deemed complete at this point.

At block 810, the buffer tree manager can determine whether to perform a flush (buffer-emptying) operation on the target node. In some embodiments, a flush operation can be performed whenever a data combining operation is performed. In other embodiments, the buffer tree manager can use other suitable criteria to make the determination whether to perform a flush operation on the target node. Accordingly, compaction processing of the target node can be deemed complete (N branch) if the buffer tree manager determines a flush of the target node is not called for. Otherwise, compaction processing of the target node can continue to block 812 (Y branch).

At block 812, the buffer tree manager can perform a flush operation on the target node, which includes pushing one or more of the compacted packets in the target node to corresponding one's of the target node's children. In some embodiments of the present disclosure, this operation can amount to storing the addresses of the compacted packets into their corresponding children nodes. FIG. 5 illustrates this aspect of the present disclosure. Suppose a flush operation is performed on source node 502, and that the keys stored in compacted packet CP1 fall within the key range of destination node 504a. A flush operation in accordance with some embodiments, includes pushing the compacted packet CP1 to the uncompacted portion of buffer 514a of the destination node 504a, as an uncompacted packet, by storing a pointer 508 to CP1 in the uncompacted portion of buffer 514a. Likewise for compacted packet CP4, if the keys stored in CP4 fall within the key range of destination node 504b, then CP4 can be pushed to the uncompacted portion of buffer 514b of node 504b, as an uncompacted packet, by storing a pointer 508 to CP4 in the uncompacted portion of buffer 514b.

Compaction processing of the target node can be deemed complete when the flushing operation is done. In some embodiments, compaction processing can continue recursively with one or more children of the target node that receive a compacted packet. Accordingly, at block 814, the buffer tree manager can recursively invoke compaction processing on children of target node that receive a compacted packet, where that child becomes the target node for the subsequent compaction process. The decision blocks 802 and 810 represent stopping criteria for the recursion, allowing the recursive process to "unwind." Other stopping criteria can be included; for example, a test (not shown) whether the target node is a leaf node would ensure that the process stops at the leaf nodes of the buffer tree.

As mentioned above in block 804, in some embodiments the uncompacted packets 902 can be stored as sorted arrays. In other embodiments (not shown), each of the uncompacted packets 902 can be stored as a search tree (e.g., a B-tree). The target node can include a set of pointers to the root nodes of these search trees. The data combining operation in block 804 can involve constructing a single "combined" search tree containing all the elements in the individual search trees. The divide operation in block 806 can include constructing new search trees by inserting elements from the combined search tree and updating the combined search tree to no longer contain those elements.

In still other embodiments (not shown), the target node can store uncompacted packets in a single contiguous region of disk. For example, each node (e.g., 302, 304, FIG. 3A) can be allocated a certain amount of disk space for the buffer 314. Uncompacted packets can be stored as sorted arrays in the buffer. The combine operation 804 can sort the arrays into a single array and store the result in unused space in the buffer 314. The flush operation in block 812 can copy a packet from the target node into unused space in the buffer of a child node.

Figure 10:
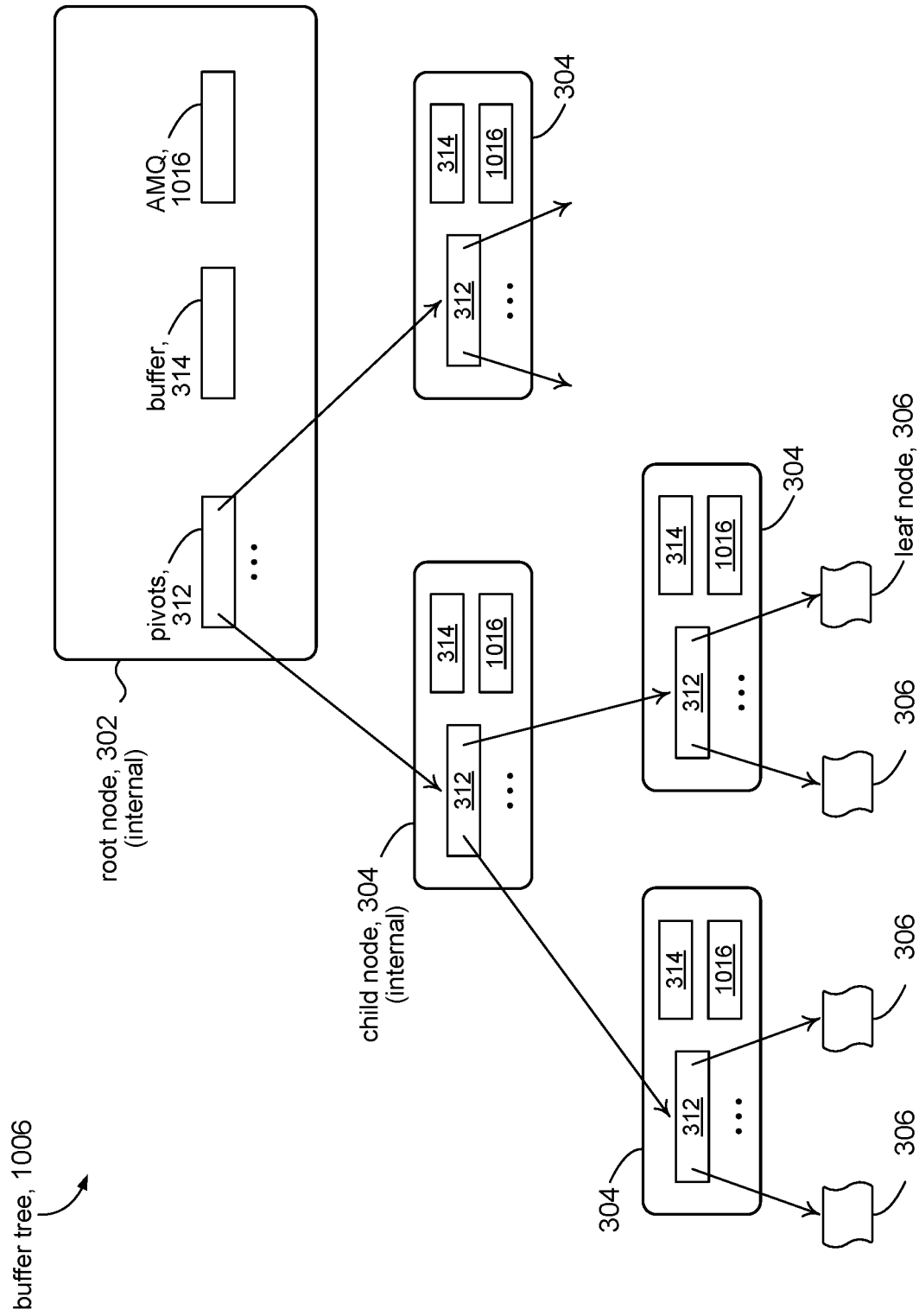
FIG. 10 illustrates the use of an approximate membership query structure in accordance with some embodiments.

Referring to FIG. 10, in some embodiments a buffer tree 1006 in accordance with the present disclosure can include an approximate membership query (AMQ) structure 1016 in each of its nodes 302, 304. In some embodiments, the AMQ 1016 can be Bloom filter, although any suitable AMQ structure can be used, for example, quotient filter and cuckoo filter.

A query in buffer tree 1006 can require searching several of the packets in a node to find the queried item, and in a worst case situation can result in searching every packet in the node. In accordance with some embodiments, the AMQ 1016 can reduce the search cost. In some embodiments for example, processing a query include using the AMQ 1016 to check whether the queried item might be in a packet, and only examines those packets that the AMQ indicates might contain the queried item. When moving a packet from one node to another, we move its corresponding AMQ, as well.

In some embodiments, each packet has a corresponding AMQ 1016. When a packet it created, a corresponding AMQ 1016 is created. A query can be processed by checking each AMQ, and search the corresponding packet when the AMQ indicates the queried item might be contain in that packet.

In other embodiments, each node can maintain a single AMQ 1016, where the AMQ acts as a key-value store, mapping keys to bit-maps indicating which of the packets in that node might contain the queried item. This enables the query operation to perform only a single AMQ query per node.

Compaction of Data Elements

In some instances, a set of n data elements having the same key may be combinable into a single data element. Consider, for example, the k-v pairs in the following set of arithmetic data elements:

data element 1: k1, x+=1
data element 2: k1, x+=3
data element 3: k1, x−=4
data element 4: k1, x+=1
data element 5: k1, x+=2

These obviated data elements can be combined to produce a single data element having the following k-v pair: k1, x+=3, which is identified by the same key and has the same outcome as the individual data elements. The set of data elements can therefore be deleted from storage and replaced with a single data element in a process referred to as data element compaction. In accordance with some embodiments, data element compaction can be performed on one or more sets of data elements in the buffer tree 106 to reduce the data storage needs of the buffer tree. Further aspects of data element compaction are discussed below.

Non-arithmetic data elements can be compacted. For example, the key might be an account number, and the value might be a balance. Thus, the stream may contain multiple data elements (records) for the same key (representing changes in the account balance over time). We want to store the data elements on disk so that we can always retrieve the most recent data element for any given key. The older stored data elements with that key are essentially wasted space because they are obviated by the most recent data element for that key. We can reclaim space by compacting such data elements.

Consider, for example, the k-v pairs in the following set of data elements:

data element 1: k1, balance=$100
data element 2: k1, balance=$200
data element 3: k1, balance=$350
data element 4: k1, balance=$75
data element 5: k1, balance=$90

The data elements 1-4 are obviated by data element 5 and thus can be deleted.

Figure 11:
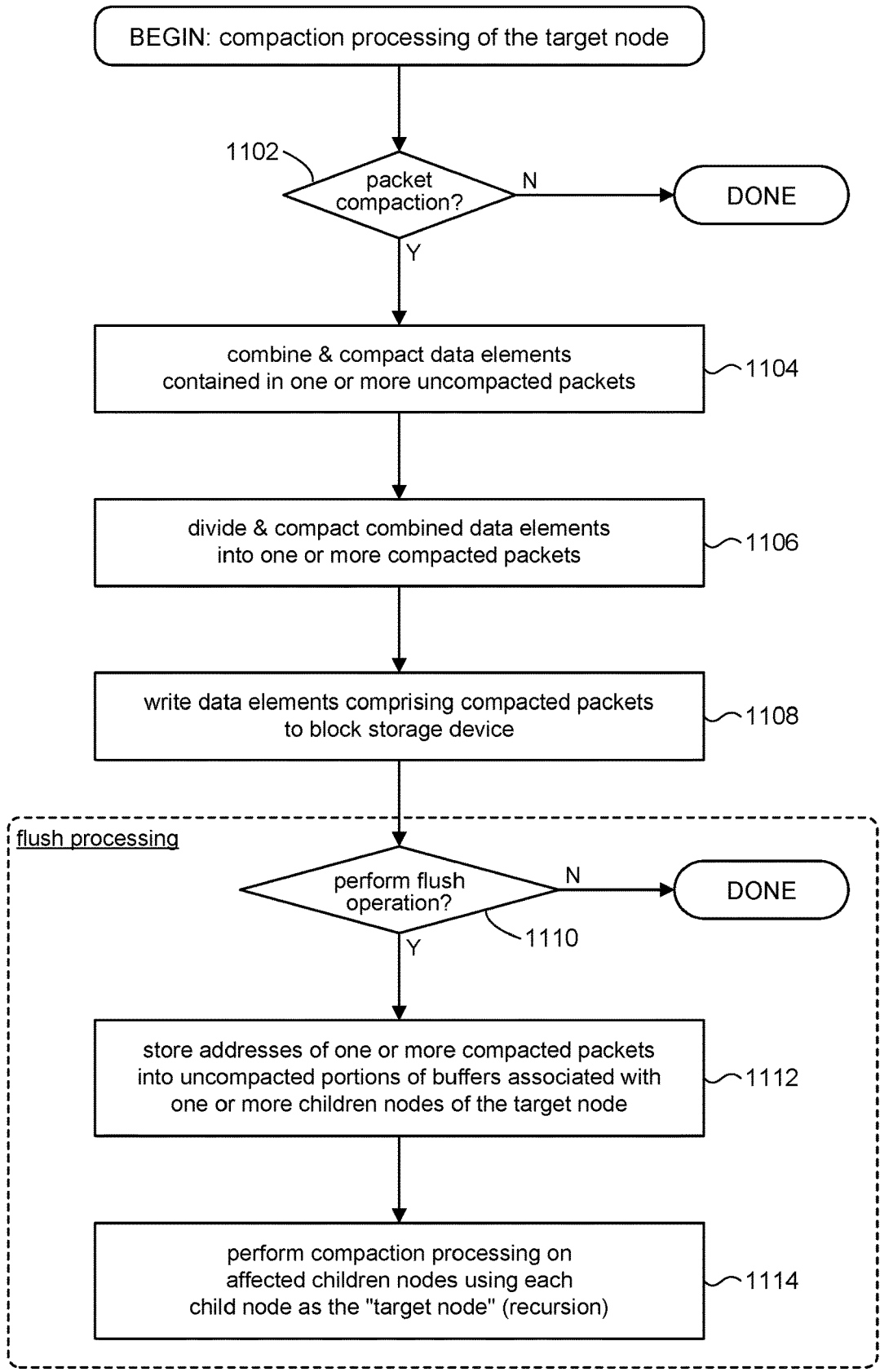
FIG. 11 is a high level flow for packet compaction in accordance with some embodiments.

Referring to FIG. 11, the discussion will now turn to a high level description of processing in the buffer tree manager (e.g., 114, FIG. 1) to conduct compaction processing of a node in accordance with some embodiments. Processing in FIG. 11 picks up from FIG. 7, where the buffer tree receives an incoming packet of data elements that is inserted in the root node, and compaction processing is invoked on the root node at block 706. In some embodiments, the buffer tree manager can include computer executable program code, which when executed by a computer system (e.g., 200, FIG. 2), can cause the computer system to perform the processing in accordance with FIG. 11. The flow of operations performed by the computer system is not necessarily limited to the order of operations shown.

At block 1102, the buffer tree manager can use a compaction trigger criterion to determine whether or not to perform packet compaction on the target node. The node that is the target of the packet compaction operation can be referred to as the target node; in the case of FIG. 7, for example, the target node would be the root node. In accordance with some embodiments, the compaction trigger criterion can be based on the amount of space used by the buffer (e.g., 314) associated with the target node in conjunction with the amount of free space on the data storage device for storing data elements. In some embodiments, for example, the compaction trigger criterion can be based on a number P of packets in the buffer of the target node. The number P can be refer to uncompacted packets only, compacted packets only, or both compacted and uncompacted packets. When the number of packets exceeds P, then packet compaction can be triggered. In some embodiments, the number P can vary depending on the amount S of free space on the data storage device. Merely to illustrate this point, if, for example, the data storage device is mostly free (e.g. 90% free), then P can be set equal to some maximum value, such as the fanout f of each node. If, on the other hand, the data storage device is nearly full (e.g., only 10% free), then P can be set to a reduced value, e.g., f/2, $\sqrt{f}$, etc., in order to trigger packet compaction more frequently. It is emphasized that these values are merely illustrative; actual values and settings may vary from system to system, and may need to be empirically determined. Generally, the value of P can vary in direct proportion to S, namely $P \propto S$.

In other embodiments, the compaction trigger criterion can be based on the size B of the buffer, where B can refer to the total size of the uncompacted packets, the total size of the compacted packets, or the total size of both the uncompacted and the compacted packets. When the size of the buffer exceeds B, then packet compaction can be triggered. In some embodiments, the size B can vary depending on the amount S of free space on the data storage device. Generally, the value of B can vary in direct proportion to S, namely $B \propto S$. In still other embodiments, other criteria can be used to trigger compaction.

If the compaction trigger criterion on the target node does not exist (e.g., number of packets is less than P), then packet compaction is not performed and insertion of the received data elements can be deemed complete (N branch). On the other hand, if the compaction trigger criterion on the target node does exist (e.g., number of packets is greater than P), then packet compaction processing can be performed; processing can continue with block 1104 (Y branch).

At block 1104, the buffer tree manager can perform a data combining operation by combining the data elements contained in one or more of the uncompacted packets in the uncompacted portion of the buffer of the target node. This aspect of the present disclosure is described above at block 804 in connection with FIG. 9, where data elements contained in the uncompacted packets are combined/merged and into a single sorted array and then written into one or more compacted packets. In accordance with some embodiments, the buffer tree manager can further perform a data element compaction operation on the data elements. In some embodiments, data element compaction can be performed on the sorted array (e.g., 904, FIG. 9). In other embodiments, depending on the nature of the data elements, it may be preferable to perform data element compaction on one or more uncompacted packets (e.g., 902) prior to combining them into a sorted array. In still other embodiments, it may be preferable that data element compaction be performed on the uncompacted packets and then again on the sorted array. In still other embodiments, data element compaction may not be performed at block 1104.

In some embodiments, data element compaction can be performed using a call-back function. Since the nature of the data elements is dependent on the users (e.g., 12, FIG. 1) of the buffer tree, the call-back function can be provided by the users. The form of the call-back function will depend on implementation details. However, the following example will serve to illustrate various aspects of a call-back function:

retval←DataCompact (dataList_In, dataList_Out), where, dataList_In contains a set of input data elements to be compacted dataList_Out contains a list of output replacement data elements retval indicates the number of data elements in dataList_Out, where 0 indicates no compaction occurred In some embodiments, the buffer tree manager can scan a packet or the sorted array to identify data elements to be added to dataList_In. In some embodiments, for example, dataList_In can comprise data elements having the same key. In other embodiments, dataList_In can comprise data elements having similar keys; for example, if a key comprises an identifier component, then those data elements having keys with the same identifier component can be selected. In some embodiments, keys falling within a range can be deemed to be related and suitable for data element compaction. In other embodiments, the DataCompact function itself can determine which data elements to compact.

In some instances, the entire set of input data elements may be replaced with a set comprising a single replacement data element, such as shown in the example given above. In other instances, depending on the nature of the data elements, data element compaction may replace the set of input data elements with a smaller set of replacement data elements, for instance:

data element 1: k1, x+=2
data element 2: k1, x+=3
data element 3: k1, x*=2
data element 4: k1, x*=4 can be replaced by the smaller set of replacement data elements:

data element 1: k1, x+=5
data element 2: k1, x*=8

Continuing with FIG. 11, at block 1106, the buffer tree manager can divide the combined data elements (e.g., stored in array 904) into one or more compacted packets in the compacted portion of the buffer, such as described above in connection with block 806. In accordance with the present disclosure, the buffer tree manager can perform data element compaction on the compacted packets. In some embodiments, for example, the buffer tree manager can scan a compacted packet to identify one or more sets of data elements for compaction, as discussed above.

At block 1108, the buffer tree manager can write the compacted packets to the data storage device. This action incurs a write (I/O) operation to the data storage device, as discussed above. We can see that data element compaction can reduce the size of the compacted packets, thus further reducing the amount of data that is written out to the data storage device to further reduce storage loading on the data storage device when storing the buffer tree.

At block 1110, the buffer tree manager can determine whether to perform a flush (buffer-emptying) operation on the target node. In some embodiments, for example, a flush operation can be performed each time that packet compaction is performed. In other embodiments, the buffer tree manager can use other suitable criteria to make the determination whether to perform a flush operation on the target node. In some embodiments, for example, a flush operation can be performed when the combined size of uncompacted packets and compacted packets exceeds a threshold value for the target node. In other embodiments, a flush operation can be performed when the number of uncompacted packets and compacted packets exceeds a threshold value for the target node. In still other embodiments, a flush operation can be performed when either the combined size or the total number exceeds its respective threshold value for the target node. Accordingly, packet compaction processing on the target node can be deemed complete (N branch) if the buffer tree manager determines a flush of the target node is not called for. Otherwise, compaction processing of the target node can continue with block 1112 (Y branch).

At block 1112, the buffer tree manager can perform a flush operation on the target node, which includes pushing one or more of the compacted packets in the target node to corresponding one's of the target node's children. In some embodiments of the present disclosure, this operation can amount to storing the addresses (pointers) of the compacted packets into their corresponding children nodes and more particularly storing the pointers into the uncompacted portion of the buffers of the children nodes. FIG. 5 illustrates this aspect of the present disclosure. Suppose a flush operation is performed on source node 502, and that the keys stored in compacted packet CP1 fall within the key range of destination node 504a. A flush operation in accordance with some embodiments, includes pushing the compacted packet CP1 to the uncompacted portion of buffer 514a of the destination node 504a, as an uncompacted packet, by storing a pointer 508 to CP1 into the uncompacted portion of buffer 514a. Likewise for compacted packet CP4, if the keys stored in CP4 fall within the key range of destination node 504b, then CP4 can be pushed to the uncompacted portion of buffer 514b of node 504b, as an uncompacted packet, by storing a pointer 508 to CP4 into the uncompacted portion of buffer 514b. Thus, although the data elements in compacted packets CP1-CP4 are actually stored on the data storage device, pushing compacted packets to children nodes does not involve making copies of the compacted packets, which would also be stored on the data storage device, but rather storing pointers to the already-existing compacted packets.

Compaction processing of the target node can be deemed complete when the flushing operation is done. In some embodiments, compaction processing can continue recursively with one or more children of the target node that receive a compacted packet. Accordingly, at block 1114, the buffer tree manager can recursively invoke compaction processing on children of the target node that receive a compacted packet, where each child becomes the target node for the subsequent compaction process. The decision blocks 1102 and 1110 represent stopping criteria for the recursion, allowing the recursive process to "unwind." Other stopping criteria can be included; for example, a test (not shown) whether the target node is a leaf node would ensure that the process stops at the leaf nodes of the buffer tree.

Query Processing

Processing a query includes receiving at least one key value (search key) from the user. The buffer tree manager 114 can traverse the buffer tree using the received search key to identify the child node (if any) that contains the search key. In some embodiments, packet compaction (e.g., per FIG. 11) can be performed on one or more internal nodes that are visited during the traversal. Thus, when data storage capacity is low, the buffer tree manager 114 can be more aggressive by performing packet compaction during non-insert operations, such as a query operation, in order to attempt recovery of storage capacity. For example, when storage capacity falls below a threshold value, packet compaction processing can be enabled when processing queries. More generally, packet compaction processing can be enabled when a compaction trigger condition exists.

Background Processing

In some embodiments, the buffer tree manager 114 can invoke packet compaction processing as a background process. For example, the background process can scan the nodes of the buffer tree 106 and perform a packet compaction operation on each node scanned. Background packet compaction can be invoked, for example, when storage capacity falls below a threshold value. More generally, packet compaction processing in the background can be invoked when a compaction trigger condition exists.

Avalanche Cascade

Figure 12:
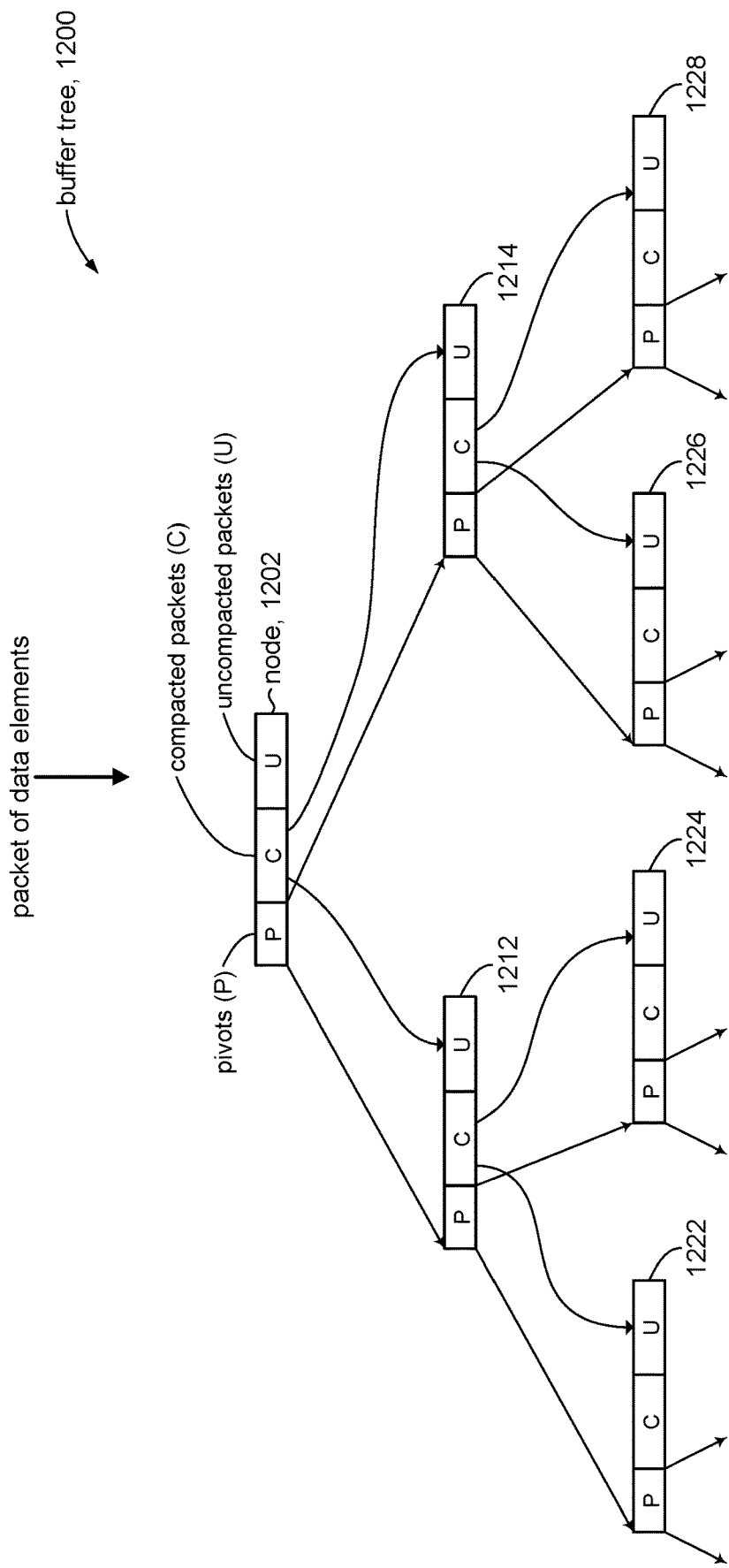
FIG. 12 illustrates the avalanche cascade.

In certain edge cases, compaction processing (e.g., FIGS. 8, 11) in a buffer tree in accordance with the present disclosure can result in a cascade effect referred to as an avalanche cascade. The buffer tree 1200 depicted in FIG. 12 illustrates a configuration in which an avalanche cascade can arise when a packet of data elements is inserted. In accordance with the processing depicted in FIGS. 8 and 11, insertion of the packet in root node 1202 can result in compacted packets in the root node 1202 to be flushed to some of its children nodes 1212, 1214. As the children nodes 1212, 1214 (recursively) process their respective incoming compacted packets, each child node can wind up having to flush compacted packets to some of its children nodes. For example, child node 1212 can flush compacted packets to all its children nodes 1222, 1224. Likewise, child node 1214 can flush compacted packets to all its children nodes 1226, 1228. The process can continue until the leaf nodes are reached. In an extreme case, the insertion of a packet of data elements in the root node 1202 can result in an avalanche cascade whereby every internal node reaches its maximum buffer capacity and has to flush packets to all its children nodes. The effect of an avalanche cascade is that the entire buffer tree is re-written, thus significantly impacting the latency (response time) of an insert operation.

An avalanche can occur when inserts to the buffer tree are uniform across keys. Early on in the life of the buffer tree, the inserts are can be processed very quickly and so many inserts can be processed per unit of time (i.e., high throughput). Flushes will be infrequent and latency (time to perform a single insert) will be low because the disk I/Os to perform an insert can be on average much less than one disk operation per insert. Over time, the buffer tree uniformly fills up from the top; every node on average will receive the same number of data elements and thus will fill up at the same time. There will come a time, however, that one more insert will trigger a cascade of flushes down the buffer tree. The response time (latency) at that point will spike because the entire buffer tree is being effectively rewritten. This behavior can be exploited by an attacker. For example, the attacker can issue insert operations with uniformly distributed keys to fill up the buffer tree and eventually cause an avalanche. Repeated attacks can severely impact performance of the buffer tree.

Figure 13:
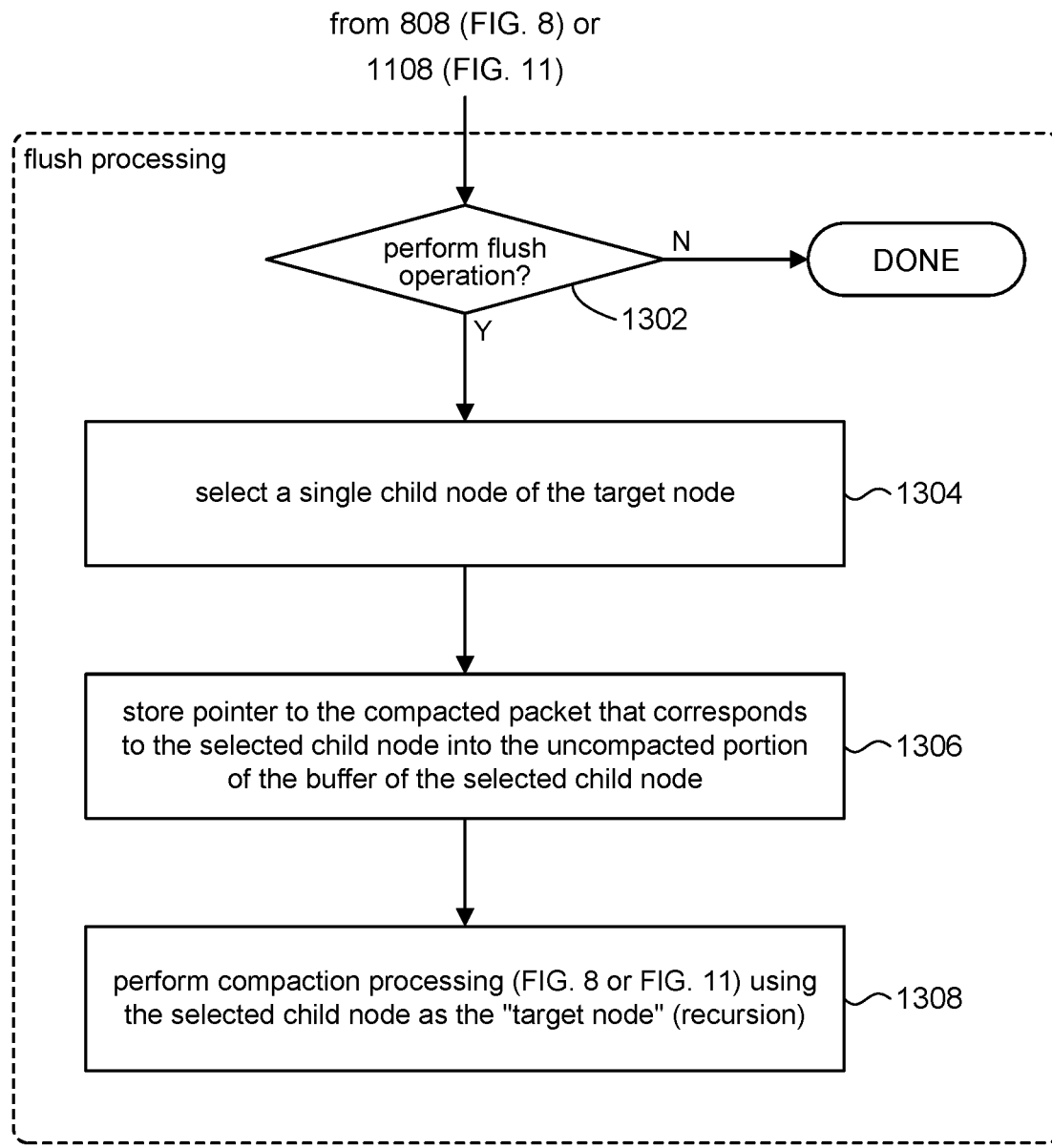
FIG. 13 is a high level flow for flush processing in accordance with some embodiments.

Referring to FIG. 13, the discussion will now turn to a high level description of flush processing in accordance with some embodiments in order to avoid the avalanche effect. The processing shown in FIG. 13 can replace the flush processing operations 810-814 in FIG. 8 and the flush processing operations 1110-1114 in FIG. 11 to provide protection against an avalanche scenario. In some embodiments, the buffer tree manager 114 can include computer executable program code, which when executed by a computer system (e.g., 200, FIG. 2), can cause the computer system to perform the processing in accordance with FIG. 13. The flow of operations performed by the computer system is not necessarily limited to the order of operations shown.

At block 1302, the buffer tree manager can determine whether to perform a flush (buffer-emptying) operation on the target node. In some embodiments, a flush operation can be performed only when the combined number of uncompacted packets and compacted packets exceeds a threshold value $MAX_{packets}$ for the target node. In other words, when an incoming packet causes the total number of packets (uncompacted and compacted) in the buffer of the target node to exceed $MAX_{packets}$, then at least one packet will be flushed out of the target node. This "one-in one-out" policy can bound the size of the target node and thus avoid the possibility of an avalanche. Accordingly, packet compaction processing on the target node can be deemed complete (N branch) if the buffer tree manager determines that the combined number of uncompacted packets and compacted packets does not exceed $MAX_{packets}$ for the target node. Otherwise, compaction processing of the target node can continue with block 1304 (Y branch).

At block 1304, the buffer tree manager can select a child node as the destination for the flush operation. In some embodiments, for example, the buffer tree manager can select at most a single child node from among the children nodes of the target node. In some embodiments, the single child node can be selected based on how many data elements (messages) the child node will receive from the target node. Each child node has a corresponding compacted packet, as shown in FIG. 4 for example. The single child node can be the child node whose corresponding compacted packet contains the largest number of date elements.

In other embodiments, the single child node can be selected in round robin fashion. Thus, for example, when the target node is processed, its first child node can be selected. The next time the target node is processed, its second child node can be selected, and so on. In some embodiments, the round robin processing can be embellished by randomly permuting the order of the children node with the completion of each round.

In still other embodiments, the single chide node can be selected in random fashion. In some embodiments, the random selection process can be weighted based on the number of data elements in the compacted packets of the children nodes so that children associated with more data elements are more likely to be chosen. These examples are illustrative; it will be appreciated that selection of the single child node can be based on other suitable criteria.

At block 1306, the buffer tree manager can perform a flush operation on the target node by pushing the compacted packet corresponding to the selected single child node to that child node. In some embodiments of the present disclosure, this operation can amount to storing the address (pointer) of the compacted packets into the uncompacted portion of the buffer of the selected child node, as illustrated in FIG. 5 for example.

Compaction processing of the target node can be deemed complete when the flushing operation is done. In some embodiments, compaction processing can continue recursively with the selected node. Accordingly, at block 1308, the buffer tree manager can recursively invoke compaction processing on the selected child node as the target node for the subsequent compaction process. Decision blocks 802 (FIG. 8), 1102 (FIG. 11) and 1302 represent stopping criteria for the recursion, allowing the recursive process to "unwind." Other stopping criteria can be included; for example, a test (not shown) whether the target node is a leaf node would ensure that the process stops at the leaf nodes of the buffer tree.

It can be appreciated that processing a flush operation in accordance with FIG. 13 restricts the flushes along a single path from the root node; each flush selects a single child node. The single root-to-leaf path avoids the possibility of an avalanche cascade, and thus can prevent an avalanche from occurring under certain use cases. The flush operation in accordance with FIG. 13 can thwart possible attackers (hackers) who attempt to issue inserts in a way as to cause avalanche situation in order to disrupt normal operations of the buffer tree.

Variable Buffer Size

In accordance with some embodiments of the present disclosure, a buffer tree in accordance with the present disclosure can be configured such that the size of the buffer in each node varies from one node to the next. In some embodiments, for example, the buffer size can vary within a range Bmin-Bmax. For example, Bmin can be a default buffer size B and Bmax can be 2×B.

As explained above, an avalanche cascade can arise when the nodes (buffers in the nodes) fill up approximately at the same rate, such as might happen when keys are uniformly distributed. A buffer tree whose nodes vary in size (i.e., their constituent buffers vary in size) can avoid the occurrence of all the nodes filling up at the same time and thus avoid triggering avalanches.

In some embodiments, the buffer size can be determined whenever the buffer tree grows. More particularly, when an original node is split into two nodes, the buffer size of the newly added node can be randomly selected, for example, a value between Bmin and Bmax. In some embodiments, the buffer of the original node can be redefined/replaced with a buffer having a randomly selected size as well.

In some embodiments, a resizing operation can be performed to redefine the buffer in a node with a new size when a flush operation on the node occurs. In some embodiments, for example, the buffer can be resized each time a flush is performed, or every other time a flush is performed, etc. In other embodiments, the decision whether to resize a buffer can be a random choice. A resizing operation can be inserted after block 812 in FIG. 8, or in block 1112 in FIG. 11, or block 1306 in FIG. 13.

Snowball Cascade

Figure 14:
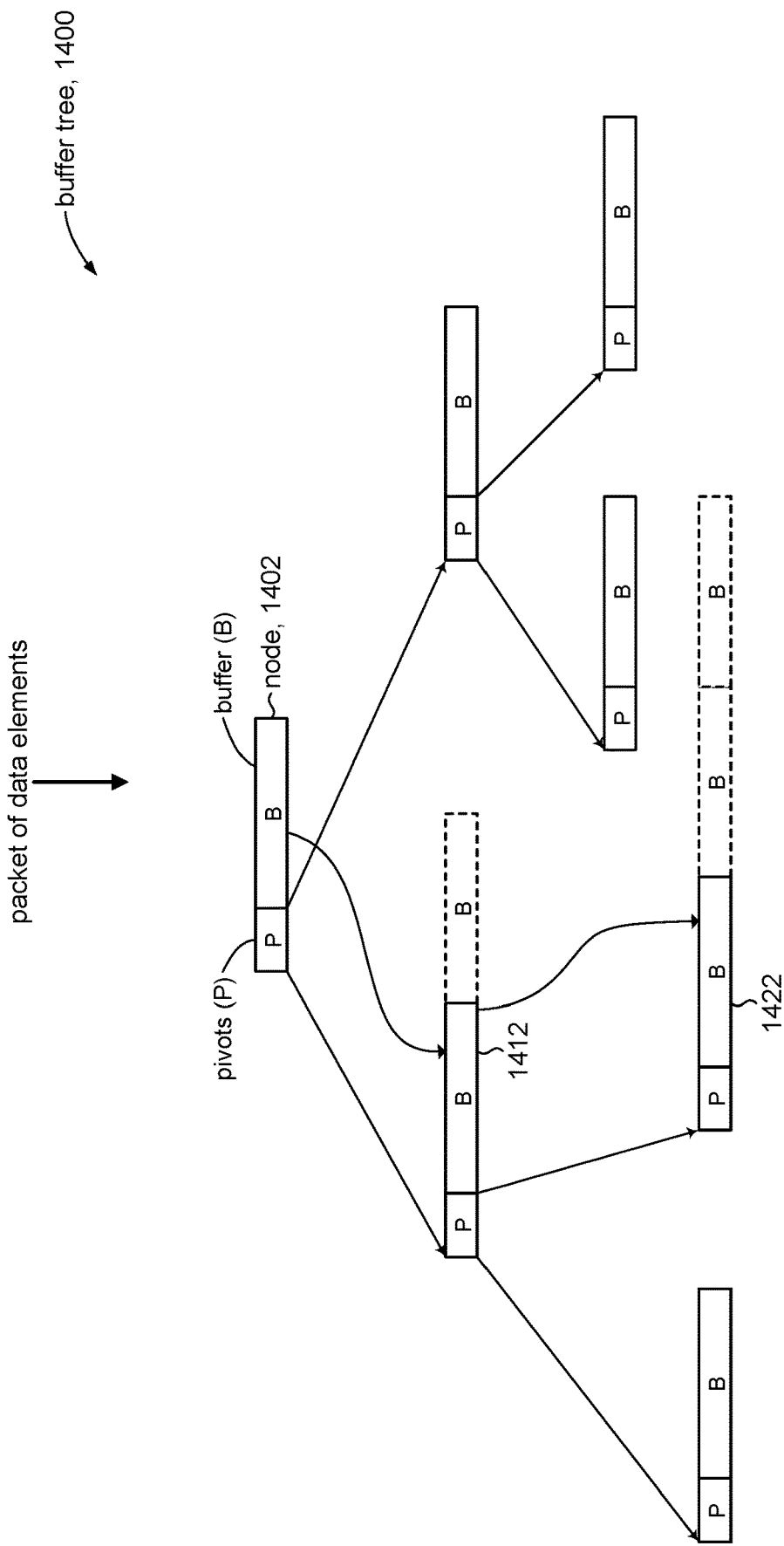
FIG. 14 illustrates a snowball cascade.

Similar to avalanches, in certain situations, compaction processing (e.g., FIGS. 8, 11) in a buffer tree in accordance with the present disclosure can result in a cascade effect referred to as a snowball cascade. The buffer tree 1400 depicted in FIG. 14 is used to describe a scenario that can create a snowball cascade. We start with insertion of an incoming data packet to root node 1402. If all the compacted data items (messages) in the root buffer belong to child node 1412, then those data items can be flushed to child node 1412 to be combined and compacted with data items already in child node 1412. If all the compacted data items in child node 1412 belong to child node 1422, then those data items can be flushed to child node 1422 to be combined and compacted with data items already in child node 1422. The process can repeat, where all the compacted data items in a node are flushed to a single child node, until the leaf node is reached. The nodes along this single root-to-leaf path that can quickly snowball in size and overrun the buffers of the nodes. As a result, additional I/O with the data storage device may be needed to accommodate the increased buffers, thus impacting response time and overall throughput. It can be appreciated that the process discussed in FIG. 13 can result in a snowball cascade.

FIG. 14 depicts the worst case, where each node in the path can be completely filled with data items that flush to a single child node so that each time a flush occurs, the buffer in the child node increases by n×B, where B is the buffer size and n is the $n^{th}$ flush. Thus, for example, node 1402 would flush B amount of data to node 1412, resulting in a buffer of size 2×B in node 1412. Node 1412 would flush 2×B amount of data to node 1422, resulting in a buffer of size 3×B in node 1422. Node 1422 would flush 3×B amount of data to a single child node, resulting in a buffer of size 4×B in the child node, and so on.

To avoid such snowball cascades, we can limit the size of the packet we flush to a child node. In some embodiments, for example, we first ensure that we do not create compacted packets that are larger than B during compaction. For example, if the data items in a given child exceed B, then we create an additional packet with the extra data items. This can ensure that we flush no more than B amount of data to a given node and thus avoid the snowball cascade effect.

Note that the above behavior implies that we can create fairly small packets which may lead to a decrease in performance. In some embodiments, we can introduce a lower threshold on the size of a compacted packet to flush. And if there are no compacted packets above that size, we can run compaction and include both the packets in the compacted and uncompacted portions.

CONCLUSION AND OBSERVATIONS

Buffers in a conventional buffer tree are typically always maintained in sorted order. Thus, when data elements are added at the root node of a conventional buffer tree, the incoming data elements are sorted with data elements already in the root's buffer, and the updated root buffer is rewritten to disk. Likewise, when data elements are flushed from the root node to its children nodes, the data elements in the children buffer are immediately sorted and rewritten to disk.

By comparison, when a buffer tree of the present disclosure is processed in accordance with the present disclosure, the cost of writing to disk (e.g., block storage subsystem 104, FIG. 1) can be delayed. An incoming packet of data elements in a node can be "stored" in the receiving node by storing a pointer to (or an address of) that packet into the uncompacted portion of the receiving node's buffer; this operation does not involve writing the data elements to disk. For example, at block 704 (FIG. 7), incoming packets are stored in the root buffer by storing a pointer (an address) into the incoming packet; likewise at block 812 (FIG. 8) where compacted packets are stored in the buffers of the children nodes.

A write to disk does not occur until the data combining operation is performed (e.g., blocks 804-808) in which data elements in the uncompacted portion of the node's buffer are combined and divided into one or more compacted packets in the compacted portion of the node's buffer. Thus, a node can continue receiving and storing packets into its uncompacted portion of the buffer until an event triggers a data combining operation, for example, such as when the size of the uncompacted portion of the buffer reaches a maximum value.

Storing packets of data elements in a node involves storing pointers to the incoming packets. The cost of a write I/O operation to disk is incurred only when a data combining operation is performed. Accordingly, a computer system that supports a buffer tree of the present disclosure and provides processing in accordance with the present disclosure can significantly reduce the amount of write I/O that is incurred when storing data elements to the buffer tree, thus improving performance in the computer system.

It can be appreciated that the decision to perform compaction in FIG. 11 involves a tradeoff between write amplification and space amplification. On the one hand, when there is a lot of disk space, the process can sacrifice space on the data storage device by lowering the frequency of packet compaction and letting the buffers in the nodes grow (space amplification) in order to reduce the amount disk I/O (reduce write amplification) that accompanies packet compaction, but at the cost of storing obviated or otherwise obsoleted data elements. On the other hand, when free space on the data storage device is low, packet compaction can occur more frequently (which increases write amplification) in order to reduce space utilization on the data storage device (reduce space amplification) by removing obsoleted data elements. The dynamic adjusting of the tradeoff between write amplification and space amplification (e.g., by adjusting the compaction trigger criterion) attempts to maintain, for the user, acceptable performance in the computer system under changing storage utilization conditions as the buffer tree grows and shrinks. In other words, response time (e.g., from an insertion request) can be reduced by avoiding write amplification and allowing for space amplification when data storage utilization is low. Conversely, response time can be increased (increased write amplification) to reduce data storage utilization when data storage capacity drops.

The various embodiments described herein may employ various computer-implemented operations involving data stored in computer systems. For example, these operations may require physical manipulation of physical quantities. Usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method comprising:
receiving, by a computer, a packet comprising a plurality of data elements to be stored in a node ("target node") in a buffer tree;
storing, by the computer, the received packet in a buffer in the target node, the buffer having a compacted portion and an uncompacted portion, the received packet stored as an uncompacted packet in the uncompacted portion of the buffer; and
performing, by the computer, a compaction operation on the target node, including the computer:
combining data elements in one or more uncompacted packets in the uncompacted portion of the buffer to produce one or more compacted packets;
storing the one or more compacted packets in the compacted portion of the buffer associated with the target node;
flushing at least one of the compacted packets to at most a single child node of the target node; and
in response to flushing the at least one of the compacted packets to the single child node, performing the compaction operation on the single child node, wherein the flushing of compacted packets proceeds along a single path toward a leaf node of the buffer tree.

2. The method of claim 1, further comprising selecting the single child node from among a plurality of children nodes of the target node based on how many data elements will be flushed to each of the children nodes.

3. The method of claim 1, further comprising selecting the single child node from among a plurality of children nodes of the target node in round robin fashion.

4. The method of claim 1, further comprising selecting the single child node from among a plurality of children nodes of the target node randomly.

5. The method of claim 1, wherein flushing at least one of the compacted packets to a single child node of the target node is selectively performed only when a total number of uncompacted and compacted packets in the buffer associated with the target node exceeds a predetermined value.

6. A non-transitory computer-readable storage medium having stored thereon computer executable instructions, which when executed by a computer device, cause the computer device to:
receive a packet comprising a plurality of data elements to be stored in a node ("target node") in a buffer tree;
store the received packet in a buffer in the target node, the buffer having a compacted portion and an uncompacted portion, the received packet stored as an uncompacted packet in the uncompacted portion of the buffer; and
perform a compaction operation on the target node, including:
combining data elements in one or more uncompacted packets in the uncompacted portion of the buffer to produce one or more compacted packets;
storing the one or more compacted packets in the compacted portion of the buffer associated with the target node;
flushing at least one of the compacted packets to at most a single child node of the target node; and
in response to flushing the at least one of the compacted packets to the single child node, performing the compaction operation on the single child node, wherein the flushing of compacted packets proceeds along a single path toward a leaf node of the buffer tree.

7. The non-transitory computer-readable storage medium of claim 6, wherein the computer executable instructions, which when executed by the computer device, further cause the computer device to select the single child node from among a plurality of children nodes of the target node based on how many data elements will be flushed to each of the children nodes.

8. The non-transitory computer-readable storage medium of claim 6, wherein the computer executable instructions, which when executed by the computer device, further cause the computer device to select the single child node from among a plurality of children nodes of the target node in round robin fashion.

9. The non-transitory computer-readable storage medium of claim 6, wherein the computer executable instructions, which when executed by the computer device, further cause the computer device to select the single child node from among a plurality of children nodes of the target node randomly.

10. The non-transitory computer-readable storage medium of claim 6, wherein flushing at least one of the compacted packets to a single child node of the target node is selectively performed only when a total number of uncompacted and compacted packets in the buffer associated with the target node exceeds a predetermined value.

11. An apparatus comprising:
one or more computer processors; and
a computer-readable storage medium comprising instructions for controlling the one or more computer processors to be operable to:
receive a packet comprising a plurality of data elements to be stored in a node ("target node") in a buffer tree;
store the received packet in a buffer in the target node, the buffer having a compacted portion and an uncompacted portion, the received packet stored as an uncompacted packet in the uncompacted portion of the buffer; and
perform a compaction operation on the target node, including:
combining data elements in one or more uncompacted packets in the uncompacted portion of the buffer to produce one or more compacted packets;
storing the one or more compacted packets in the compacted portion of the buffer associated with the target node;
flushing at least one of the compacted packets to at most a single child node of the target node; and
in response to flushing the at least one of the compacted packets to the single child node, performing the compaction operation on the single child node, wherein the flushing of compacted packets proceeds along a single path toward a leaf node of the buffer tree.

12. The apparatus of claim 11, wherein the computer-readable storage medium further comprises instructions for controlling the one or more computer processors to be operable to select the single child node from among a plurality of children nodes of the target node based on how many data elements will be flushed to each of the children nodes.

13. The apparatus of claim 11, wherein the computer-readable storage medium further comprises instructions for controlling the one or more computer processors to be operable to select the single child node from among a plurality of children nodes of the target node in round robin fashion.

14. The apparatus of claim 11, wherein the computer-readable storage medium further comprises instructions for controlling the one or more computer processors to be operable to select the single child node from among a plurality of children nodes of the target node randomly.

15. The apparatus of claim 11, wherein flushing at least one of the compacted packets to a single child node of the target node is selectively performed only when a total number of uncompacted and compacted packets in the buffer associated with the target node exceeds a predetermined value.

* * * * *